(12) United States Patent
Saito

(10) Patent No.: US 8,233,031 B2
(45) Date of Patent: Jul. 31, 2012

(54) OBJECT DETECTING SYSTEM

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 936 days.

(21) Appl. No.: 12/260,538

(22) Filed: Oct. 29, 2008

(65) Prior Publication Data
US 2009/0244263 A1 Oct. 1, 2009

(30) Foreign Application Priority Data
Oct. 29, 2007 (JP) .................. 2007-280483

(51) Int. Cl.
*H04N 15/00* (2006.01)
*H04N 13/02* (2006.01)
(52) U.S. Cl. ................. 348/47; 382/154; 382/168
(58) Field of Classification Search .......... 348/47; 382/154, 168
See application file for complete search history.

(56) References Cited

U.S. PATENT DOCUMENTS

| 6,366,691 | B1 * | 4/2002 | Sogawa | 382/154 |
|---|---|---|---|---|
| 6,381,360 | B1 * | 4/2002 | Sogawa | 382/154 |
| 8,094,934 | B2 * | 1/2012 | Morimitsu | 382/168 |
| 2009/0237491 | A1 * | 9/2009 | Saito | 348/47 |

FOREIGN PATENT DOCUMENTS

| JP | 05-114099 | 5/1993 |
|---|---|---|
| JP | 05-265547 | 10/1993 |
| JP | 06-266828 | 9/1994 |
| JP | 10-283461 | 10/1998 |
| JP | 10-283477 | 10/1998 |
| JP | 2000-123151 | 4/2000 |
| JP | 2006-072495 | 3/2006 |
| JP | 2006-107314 | 4/2006 |

* cited by examiner

*Primary Examiner* — Dustin Nguyen
(74) *Attorney, Agent, or Firm* — Smith, Gambrell & Russell, LLP

(57) ABSTRACT

An object detecting system includes stereo-image taking means for outputting a reference image and a comparative image, stereo matching means for performing stereo matching, object detecting means for detecting an object in the reference image, estimated-region setting means for setting estimated regions of the object in the current frame in the reference image and the comparative image, on the basis of a distance of the object in the reference image in the previous frame, and determination means for correlating information about the object detected in the estimated region of the reference image or information that the object is not detected with information that noise is included, when an absolute value of a difference between average luminances of the estimated regions is more than or equal to a predetermined threshold value.

10 Claims, 16 Drawing Sheets

OBJECT DETECTING SYSTEM

CROSS-REFERENCE TO RELATED APPLICATIONS

The disclosure of Japanese Patent Application No. 2007-280483 filed on Oct. 29, 2007 including the specification, drawings and abstract is incorporated herein by reference in its entirety.

BACKGROUND OF THE INVENTION

1. Field of the Invention

The present invention relates to object detecting systems, and more particularly, to an object detecting system that detects an object by stereo matching of a pair of images taken by stereo-image taking means.

2. Description of the Related Art

In a typical method for measuring the distance to an object around a vehicle with a stereo-image taking means mounted inside a front glass of the vehicle, a pair of images are taken by a pair of cameras, and one of the taken images used for reference (hereinafter referred to as a reference image) is compared with the other image (hereinafter referred to as a comparative image). By comparison, a difference between positions of corresponding portions of the same object in the images, that is, a parallax is calculated, and the distance to the object is calculated from the parallax according to the principle of triangulation. The corresponding portions of the same object in the reference image and the comparative image are typically located by stereo matching (for example, see Japanese Unexamined Patent Application Publication No. 10-283461).

In such stereo matching, for example, when an image of an object is taken by only one of a pair of cameras since a wiper passes over the front glass in front of the other camera and the other camera is hidden by the wiper, it is difficult to specify the position of the object in the image taken by one camera, and to calculate the distance to the object.

Japanese Unexamined Patent Application Publication No. 2000-123151 proposes an image processing method using a single camera. In this method, differences in pixel density between an image of an environment in front of a vehicle taken in the current frame and an image of the environment taken in the previous frame are calculated. On the basis of the average density and distribution of a difference image obtained from the differences, it is determined whether an image of the wiper is included in the image taken in the current frame.

Japanese Unexamined Patent Application Publication No. 2006-107314 also proposes an image processing apparatus using a single camera. In this apparatus, the moving speeds of objects in a taken image are calculated by using optical flow in which the moving directions and speeds of the objects in the image are shown by vectors. On the basis of the moving speeds, a wiper whose image is included in the taken image is detected. When the wiper is detected in the image, an area of the image of the front environment missing because of the wiper is compensated for by a compensation image obtained from the previous frame.

Unfortunately, in a case in which the technique disclosed in Japanese Unexamined Patent Application 2000-123151 is applied to a pair of cameras in the stereo-image taking means, when an external environment rapidly changes between the previous frame and the current frame, for example, when sunbeams stream through leaves or shade is given while a preceding vehicle is traveling along a road lined with trees, it may be erroneously determined that an image of the wiper is included in the image taken in the current frame.

When the technique disclosed in Japanese Unexamined Patent Application Publication No. 2006-107314 is applied to the stereo-image taking means, frames need to be taken at a sufficiently high shutter speed to successively capture the motion of the wiper in order to calculate the moving speed of the wiper. Moreover, a pair of cameras need to be mounted at a distance from the front glass so as to capture the motion of the wiper through several frames. However, in situations other than wiper detection, it is usually unnecessary to take images at a high shutter speed, and it is often difficult to mount the stereo-image taking means at a distance from the front glass, for example, because of layout constraints. In addition, much time is normally taken to calculate the optical flow, and this puts a heavy burden on the operations.

When objects around the vehicle are detected on the basis of an image taken by the stereo-image taking means, the stereo-image taking means is forced to be mounted inside the front glass, and noise inevitably occurs in the taken image because of raindrops and dirt adhering to the front glass. Further, it is necessary to remove raindrops and dirt adhering to the front glass in front of the camera with the wiper while rain is falling, and an image of the wiper is inevitably included in the image taken by the camera. When noise, such as images of the wiper and adherents, is included in the taken image, it is difficult to obtain highly reliable information about the distance to the object obtained by stereo matching performed.

In contrast, in the above-described case in which an external environment rapidly changes between the previous frame and the current frame, for example, when sunbeams stream through leaves or shade is given while the preceding vehicle is traveling along a road lined with trees, as long as an image of the external environment has been properly taken, highly reliable information about the distance to the object can be obtained by stereo matching based on the taken image.

Therefore, an object detecting system that detects objects by stereo matching is required to accurately detect and distinguish between changes of the external environment and noise due to the wiper and adherents.

SUMMARY OF THE INVENTION

The present invention has been made in view of these circumstances, and an object of the invention is to provide an object detecting system that can detect objects while accurately distinguishing between changes of an external environment and noise due to a wiper and adherents.

In order to solve the above problems, an object detecting system according to an aspect of the present invention includes stereo-image taking means including a pair of image taking means mounted inside a front glass, the stereo-image taking means simultaneously taking images of an object around a vehicle in which the object detecting system is mounted and outputting the images as a reference image and a comparative image; stereo matching means for performing, in the comparative image, stereo matching of a reference pixel block set in the reference image and having a predetermined number of pixels, and for calculating a parallax between the reference pixel block and a comparative pixel block specified in the comparative image, the parallax being calculated for each reference pixel block; object detecting means for calculating a distance to the vehicle on the basis of the parallax and for detecting the object in the reference image on the basis of the distance; estimated-region setting means for setting, in the reference image and the comparative image, estimated regions where images of the object are expected to be taken in a current frame, on the basis of the distance of the object in the reference image in the previous frame and a speed of the object relative to the vehicle calculated from the distance; and determination means for determining whether an absolute value of a difference between an average luminance of the estimated region in the reference image and an average luminance of the corresponding estimated region in the comparative image is more than or equal to a predetermined threshold value, and for correlating information about the object detected in the estimated region of the reference image or information that the object is not detected, with information that noise is included.

In this case, regardless of whether the object is detected in the reference image in the current frame, estimated regions, in which images of the object are expected to be taken in the current frame, are respectively set in the reference image and the comparative image on the basis of the result of the previous frame. Further, it is determined, on the basis of the absolute value of a difference between the average luminances of the estimated regions, whether information about the object detected in the estimated region of the reference image or information that the object is not detected includes noise. Therefore, it is possible to accurately distinguish between a case in which noise is caused by a wiper cutting in front of one of the image taking means or a substance adhering to the front glass and a case in which an external environment changes.

Since the object can be detected by thus accurately distinguishing between noise and the change of the external environment, it is possible to accurately distinguish between a case in which only the external environment changes and information about the detected object and information that the object is not detected are highly reliable, and a case in which noise occurs and information about the detected object and information that the object is not detected are not reliable. When reliability of the information is low, information about the reliability can be output in proper correlation with the object information.

For example, when automatic running control of the vehicle is performed on the basis of the output information, the information can be used for automatic control after recognizing reliability of the information. This allows accurate automatic control.

Preferably, the determination means decreases reliability of information about the parallax or the distance calculated for the object detected in the estimated region of the reference image, or decreases reliability of the information that the object is not detected in the estimated region of the reference image when the object is not detected in the estimated region.

In this case, information about the object is correlated with reliability beforehand. By changing the reliability of information to a large value when the object is detected normally and to a small value when the object is detected or is not detected, the object information is correlated with information that noise is included. Therefore, reliability of information about the object detected in the estimated region of the reference image or information that the object is not detected can be evaluated by simply recognizing the information about reliability. This allows the above-described advantages of the present invention to be achieved more effectively.

Preferably, the object detecting means calculates a position of the detected object relative to the vehicle on the basis of the distance of the object, and stores the relative position in time series. The estimated-region setting means estimates a relative position of the object in the current frame on the basis of the relative position and the relative speed of the object in the previous frame, and sets, in the reference image, an estimated region where an image of the object is expected to be taken. The estimated-region setting means also estimates a parallax in the current frame on the basis of the estimated relative position of the object, and sets an estimated region in the comparative image on the basis of the parallax and the estimated region set in the reference image.

In this case, the position of the detected object relative to the vehicle is calculated on the basis of the distance of the object, and an estimated region is set in the reference image on the basis of the relative position. Further, a parallax is estimated from the estimated region set in the reference image, and an estimated region is set in the comparative image on the basis of the parallax. Therefore, estimated regions can be easily and accurately set in the reference image and the comparative image, and the above-described advantages of the present invention can be achieved more accurately.

Preferably, the relative speed in the next frame is calculated by smoothing filtering in which the relative speed of the object used in the current frame and a difference between the relative positions in the previous frame and the current frame are subjected to weighted addition by an addition ratio.

In this case, the relative speed of the object used in the next frame is calculated by smoothing the relative speed used in the current frame and the detection result of the object in the current frame. Therefore, even when the detection result of the object fluctuates, fluctuation is suppressed, and the speed of the object relative to the vehicle can be obtained in a state closer to reality. Moreover, estimated regions can be more properly set in the reference image and the comparative image. This allows the above-described advantages of the present invention to be achieved more accurately.

Preferably, when the object correlated with the information that noise is included is detected in the estimated region of the reference image, the addition ratio of the difference is decreased for the object in the smoothing filtering in the current frame.

In this case, when the object correlated with the information that noise is included is detected in the estimated region of the reference image, the addition ratio of the detection result is decreased in smoothing filtering in the current frame. This can prevent the calculated relative speed from being made greatly different from an actual value by the detection result having low reliability, and a proper relative speed is calculated. Therefore, the above-described advantages of the present invention can be achieved more accurately.

Preferably, when the object correlated with the information that noise is included is not detected in the estimated region of the reference image, the relative speed of the object used for the object in the current frame is set as the relative speed in the next frame.

When the sampling period is short, the relative speed of the object in the next frame is not different so much from the relative speed in the current frame. For this reason, when the object correlated with the information that noise is included is not detected in the estimated region of the reference image, it is more practical to use the relative speed used in the current frame than to unreasonably correct the relative speed of the object used in the next frame. Therefore, with the above configuration, estimated regions can be set on the basis of a more realistic relative speed, and the above-described advantages of the present invention can be achieved properly.

Preferably, the determination means deletes information about the object when the object is not detected in the estimated region set in the reference image.

In this case, since information about the object is deleted when the object is not detected in the estimated region of the reference image, output of object information having low reliability is avoided. Therefore, in addition to the above-described advantages of the present invention, reliability of the object detecting system can be improved.

Preferably, when the information about the object detected in the estimated region of the reference image or the information that the object is not detected is correlated with the information that noise is included, the determination means tightens a criterion of stereo matching performed by the stereo matching means.

In this case, when information about the object is correlated with information that noise is included, the criterion of stereo matching performed by the stereo matching means is tightened. Even when the absolute value of the difference between average luminances of the estimated regions in the reference image and the comparative image is large and reliability of the information about the detected object is low, only comparative pixel blocks in the comparative image that have a luminance pattern very close to that of the reference pixel blocks in the reference image are specified by stereo matching. Therefore, in addition to the above-described advantages of the present invention, reliability of information about the distance of the detected object can be improved further.

Preferably, when the average luminance in one of the estimated region of the reference image and the estimated region of the comparative image is less than the average luminance of the other estimated region by the threshold value only for about one frame, the determination means determines that a wiper cuts in front of the image taking means that takes the reference image or the comparative image to which the estimated region having the lower average luminance belongs.

In this case, when the absolute value of the difference between the average luminances in the estimated regions of the reference image and the comparative image is large only for about one frame, it can be determined that the wiper has cut in front of the image taking means in which the average luminance decreases. Therefore, in addition to the above-described advantages of the present invention, it can be detected that the wiper has cut.

Preferably, when a state in which an absolute value of a difference between the average luminance in one of the estimated region of the reference image and the average luminance in the estimated region of the comparative image is more than or equal to the threshold value continues for a predetermined number of frames or more, the determination means determines that a substance adheres to the front glass in front of the image taking means that takes the reference image or the comparative image.

In this case, when the absolute value of the difference between the average luminances of the estimated regions in the reference image and the comparative image is large for a relatively large number of frames, it can be determined that a substance has adhered to the front glass in front of the image taking means in which the average luminance decreases. Therefore, in addition to the above-described advantages of the present invention, it can be detected that the substance has adhered to the front glass in front of the image taking means.

DESCRIPTION OF THE PREFERRED EMBODIMENTS

An object detecting system according to an embodiment of the present invention will be described below with reference to the drawings.

Figure 1:
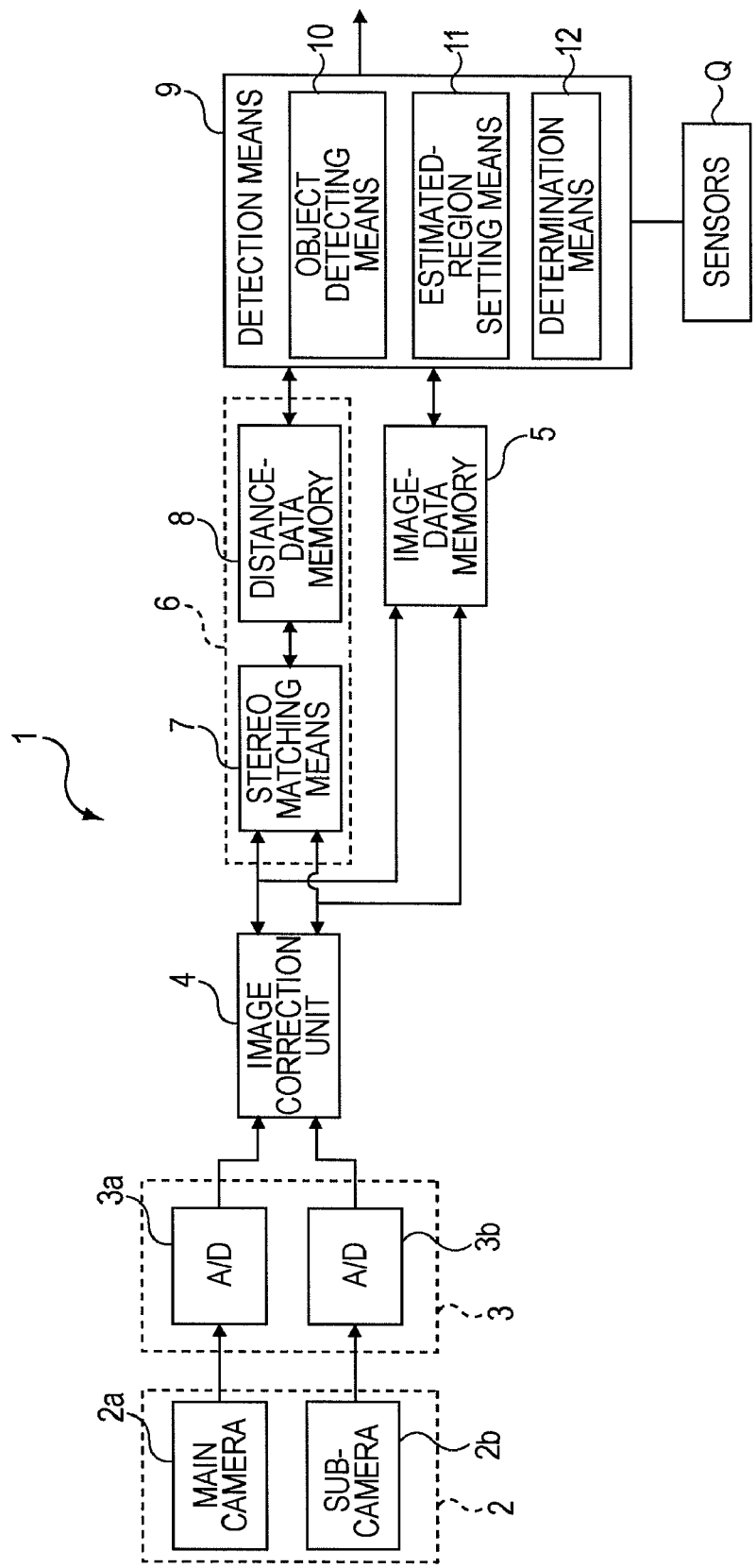
FIG. 1 is a block diagram showing a configuration of an object detecting system according to an embodiment.

Referring to FIG. 1, an object detecting system 1 according to the embodiment includes a stereo-image taking means 2, an image processing means 6 including a stereo matching means 7 and so on, and a detection means 9 including an object detecting means 9 and so on.

The structures from the stereo-image taking means 2 to the detection means 9 have been described in detail in Japanese Unexamined Patent Application Publication Nos. 5-114099, 5-265547, 6-266828, 10-283461, 10-283477, and 2006-

72495 filed earlier by the present applicant. Therefore, the structures will now be described briefly.

In this embodiment, the stereo-image taking means 2 is formed by a stereo camera including a main camera 2a and a sub-camera 2b respectively including image sensors, such as CCDs or CMOS sensors, which are in synchronization with each other. The main camera 2a and the sub-camera 2b are mounted inside a front glass of a vehicle (not shown), for example, near a room mirror and are spaced a predetermined distance apart in the vehicle width direction, that is, in the right-left direction.

Figure 2:
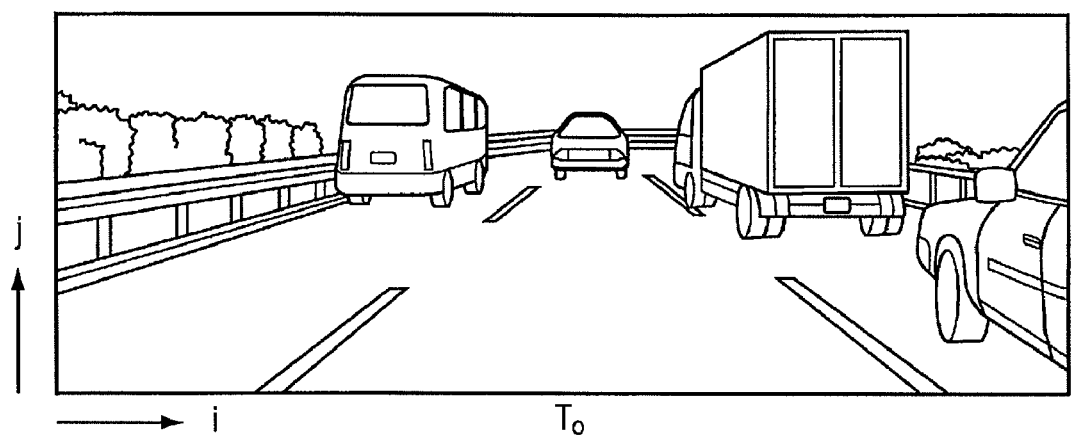
FIG. 2 shows an example of a reference image.

The main camera 2a and the sub-camera 2b are mounted at the same height from the road surface, simultaneously take images of an object around the vehicle, particularly, in front of the vehicle at a predetermined sampling cycle, and output information about the taken images. For example, the main camera 2a close to the driver outputs image data on a reference image $T_0$ shown in FIG. 2, and the sub-camera 2b remote from the driver outputs image data on a comparative image $T_C$ that is not shown.

Image data output from the main camera 2a and the sub-camera 2b are converted from analog images into digital images in which each pixel has a luminance of a predetermined number of, for example, 256 levels of gray scale by A/D converters 3a and 3b in a conversion means 3. The digital images are subjected to image correction, such as displacement and noise removal, by an image correction unit 4. After image correction, the image data is transmitted to and stored in an image-data memory 5, and is also transmitted to the image processing means 6.

The image processing means 6 includes a stereo matching means 7, such as an image processor, and a distance-data memory 8. The stereo matching means 7 performs stereo matching for the reference image $T_0$ and the comparative image.

Figure 3:
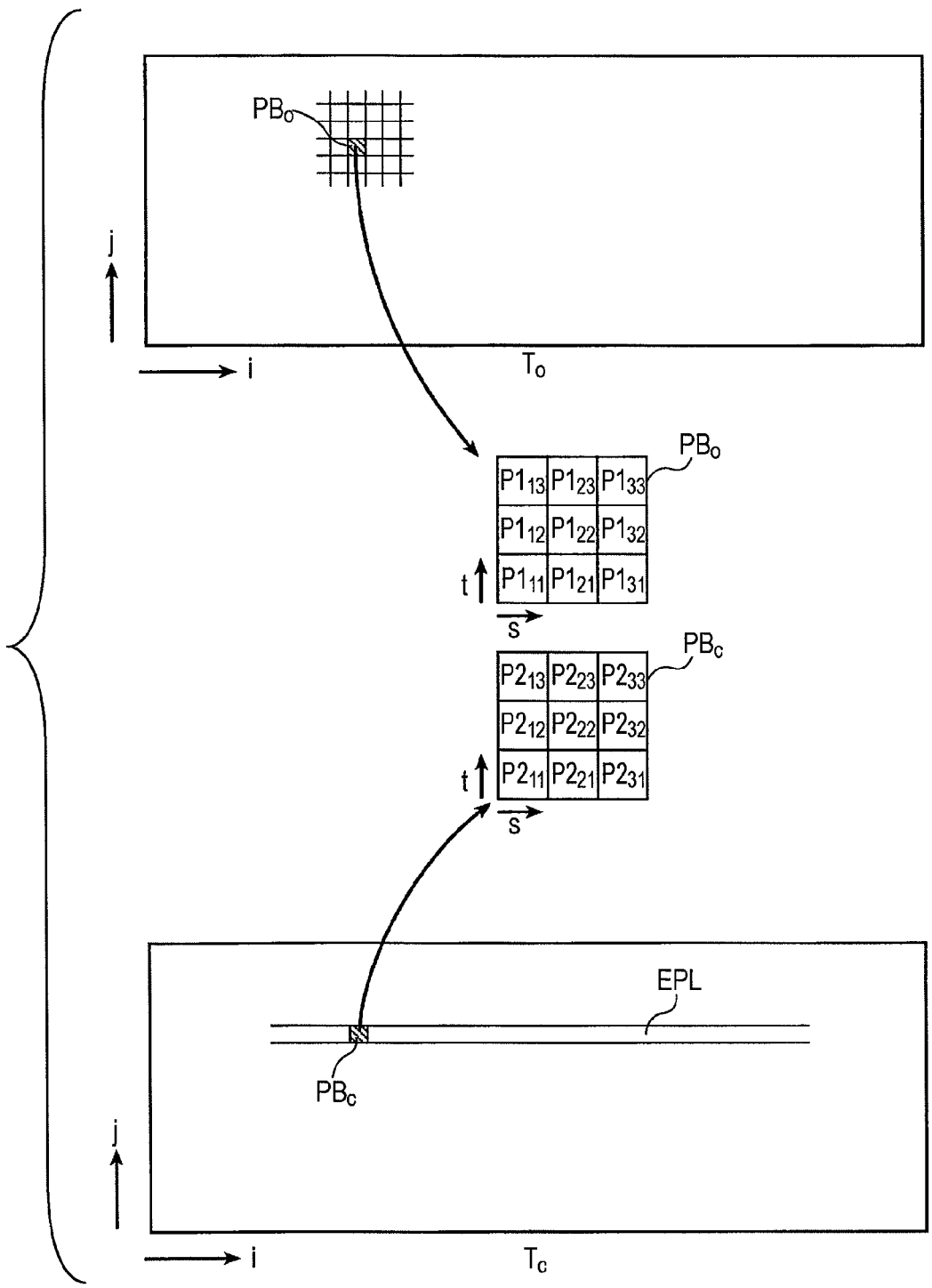
FIG. 3 explains how stereo matching is performed by an image processor.

More specifically, as shown in FIG. 3, the stereo matching means 7 sets a reference pixel block $PB_0$ defined by a predetermined number of pixels, such as 3 by 3 pixels or 4 by 4 pixels, in the reference image $T_0$, calculates SAD values serving as differences in luminance pattern between the reference pixel block $PB_0$ and comparative pixel blocks $PB_C$, which have the same shape as that of the reference pixel block $PB_0$, on an epipolar line EPL in a comparative image $T_C$ corresponding to the reference pixel block $PB_0$ according to the following Expression (1), and specifies a comparative pixel block $PB_C$ having the smallest SAD value:

$$SAD = \sum_{s,t} |p1st - p2st| \qquad (1)$$

P1st represents the luminance of the pixel in the reference pixel block $PB_0$, and p2st represents the luminance of the pixel in the comparative pixel block $PB_C$. The sum of the luminances are calculated for all pixels in a region where $1 \leq s \leq 3$ and $1 \leq t \leq 3$ when each of the reference pixel block $PB_0$ and the comparative pixel block $PB_C$ is set as a region defined by 3 by 3 pixels, and for all pixels in a region where $1 \leq s \leq 4$ and $1 \leq t \leq 4$ when each of the reference pixel block $PB_0$ and the comparative pixel block $PB_C$ is set as a region defined by 4 by 4 pixels.

The stereo matching means 7 thus calculates a parallax dp from the position of each reference pixel block $PB_0$ in the reference image $T_0$ and the position of a specified comparative pixel block $PB_C$ in the comparative image $T_C$ corresponding to the reference pixel block $PB_0$. In this embodiment, a threshold value of the SAD value is set as a criterion of stereo matching beforehand. When a SAD value between a reference pixel block $PB_0$ in the reference image $T_0$ and a comparative pixel block $PB_C$ specified corresponding thereto is more than the threshold value, the stereo matching means 7 determines that matching is not valid, and sets the parallax dp at 0.

The stereo matching means 7 transmits information about the parallax dp thus calculated for each reference pixel block $PB_0$ to the distance-data memory 8 and stores the information therein.

The point (X, Y, Z) in real space, the parallax dp, and the point (i, j) in a distance image $T_Z$ can be uniquely correlated by coordinate conversion given by the following Expressions (2) to (4) according to the principle of triangulation:

$$X = CD/2 + Z \times PW \times (i - IV) \qquad (2)$$

$$Y = CH + Z \times PW \times (j - JV) \qquad (3)$$

$$Z = CD/(PW \times (dp - DP)) \qquad (4)$$

where a point on the road surface just below the midpoint between the main camera 2a and the sub-camera 2b is designated as the origin, the X-axis indicates the vehicle width direction (right-left direction), the Y-axis indicates the vehicle height direction, and the Z-axis indicates the vehicle length direction (front-rear direction).

In these expressions, CD represents the distance between the main camera 2a and the sub-camera 2b, PW represents the viewing angle for one pixel, CH represents the mounting height of the main camera 2a and the sub-camera 2b, IV and JV respectively represent i and j coordinates in the distance image $T_Z$ of the point at infinity in front of the vehicle, and DP represents the vanishing point parallax. When the parallax dp is 0, the above-described calculations according to Expressions (2) to (4) are not performed.

Figure 4:
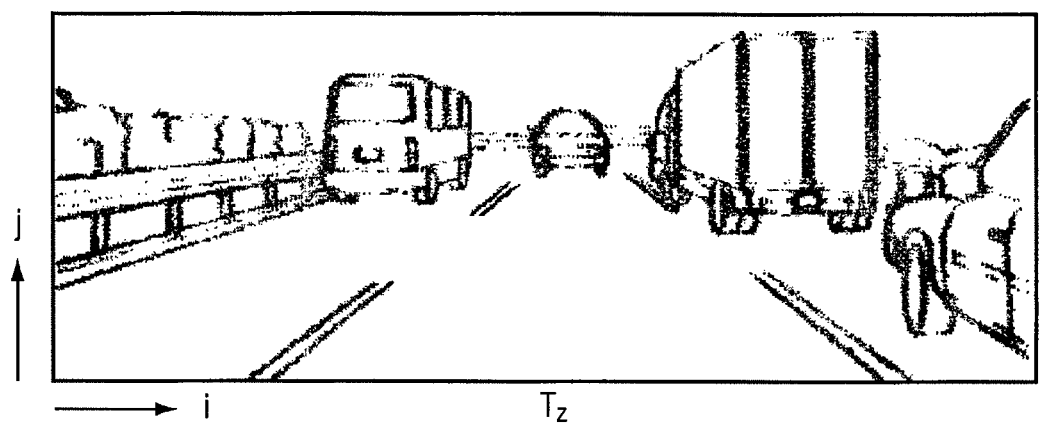
FIG. 4 shows a distance image formed on the basis of the reference image shown in FIG. 2.

In this embodiment, the operations are performed by using a distance image $T_Z$ (see FIG. 4) formed by assigning parallaxes dp to the reference pixel blocks $PB_0$ in the reference image $T_0$, as described above. Alternatively, at the time when the parallaxes dp are stored in the distance-data memory 8, they can be converted into distances Z according to Expression (4) described above, and the operations can be performed by using a distance image obtained by assigning the distances Z to the reference pixel blocks $PB_0$ in the reference image $T_0$.

The detection means 9 is formed by a microcomputer in which a CPU, a ROM, a RAM, an input/output interface, etc. (not shown) are connected to a bus. The detection means 9 is connected to sensors Q such as a vehicle-speed sensor, a yaw-rate sensor, and a steering-angle sensor for measuring and outputting the vehicle speed V, yaw rate γ, steering angle δ of the steering wheel. The yaw-rate sensor can be replaced with a device for estimating a yaw rate from the speed of the vehicle.

As shown in FIG. 1, the detection means 9 includes an object detecting means 10, an estimated-region setting means 11, and a determination means 12. The detection means 9 also includes a memory that is not shown. Necessary data is input from the sensors Q to the above means in the detection means 9.

Figure 5:
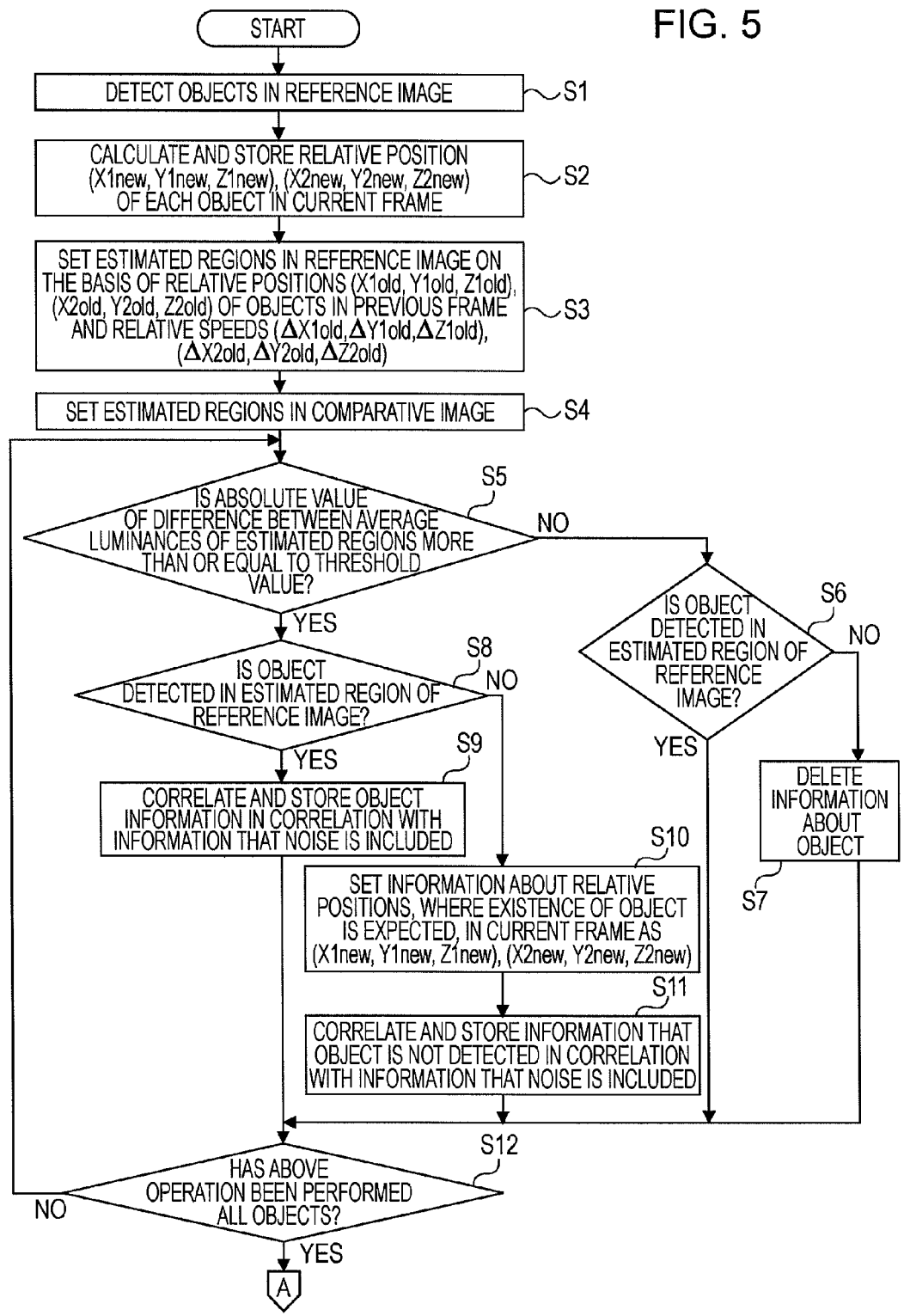
FIG. 5 is a flowchart showing a procedure performed by a detection means.
Figure 6:
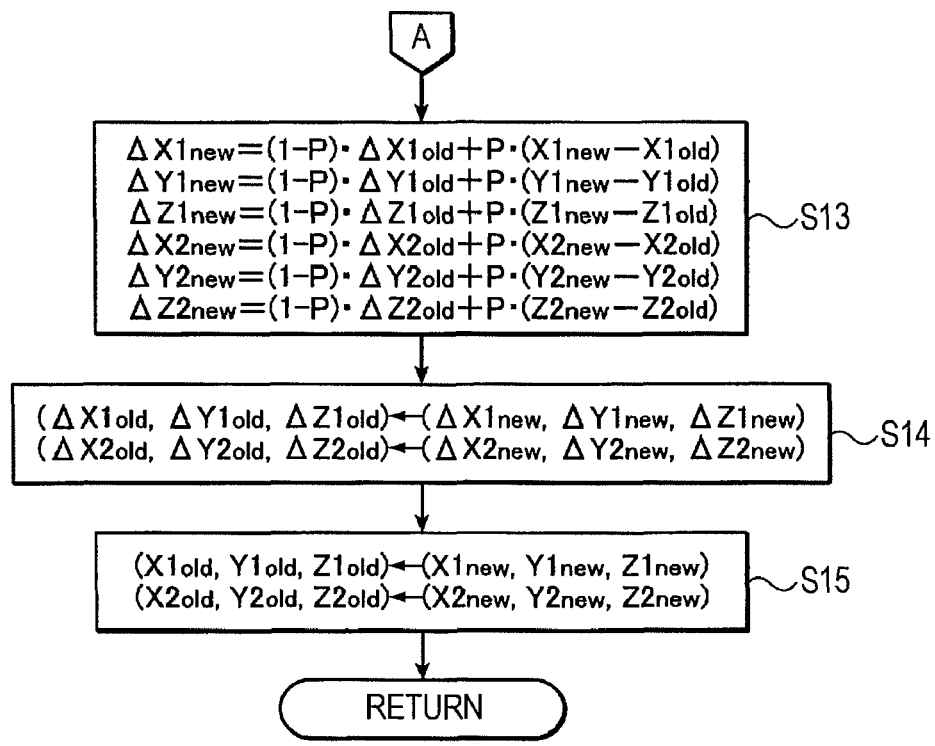
FIG. 6 is a flowchart showing the procedure performed by the detection means.

The detection means 9 performs processing according to flowcharts shown in FIGS. 5 and 6. The following description will be given according to the flowcharts.

The object detecting means 10 is based on the vehicle surroundings monitoring apparatus disclosed in, for example, Japanese Unexamined Patent Application Publication No. 10-283461, as described above. Since detailed descriptions have been given in the publication, the structure and processing of the object detecting means 10 will be described below.

In the object detecting means 10, the above-described detected parallaxes dp are converted into data on distances Z, and data on the adjoining distances Z are combined into groups, thus detecting objects in the reference image $T_O$ (Step 1 in FIG. 5).

Figure 7:
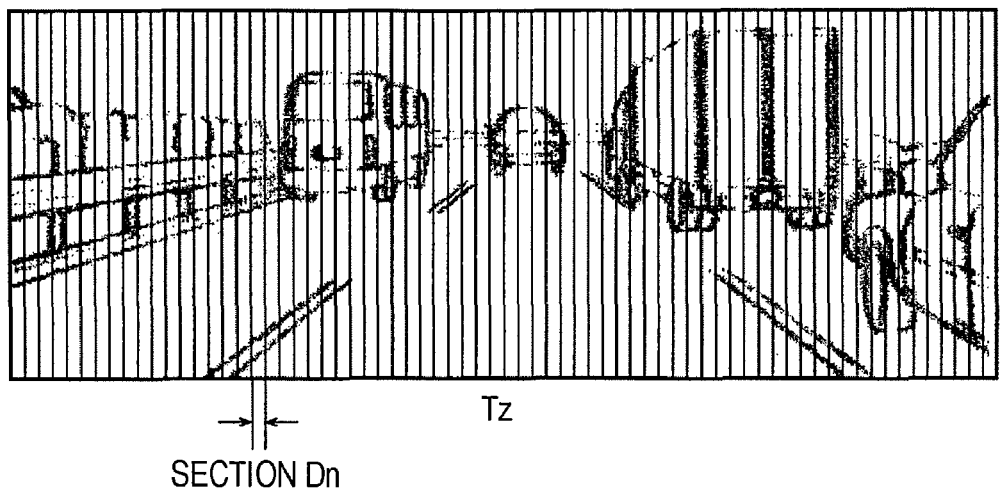
FIG. 7 explains sections of the distance image shown in FIG. 7.
Figure 8:
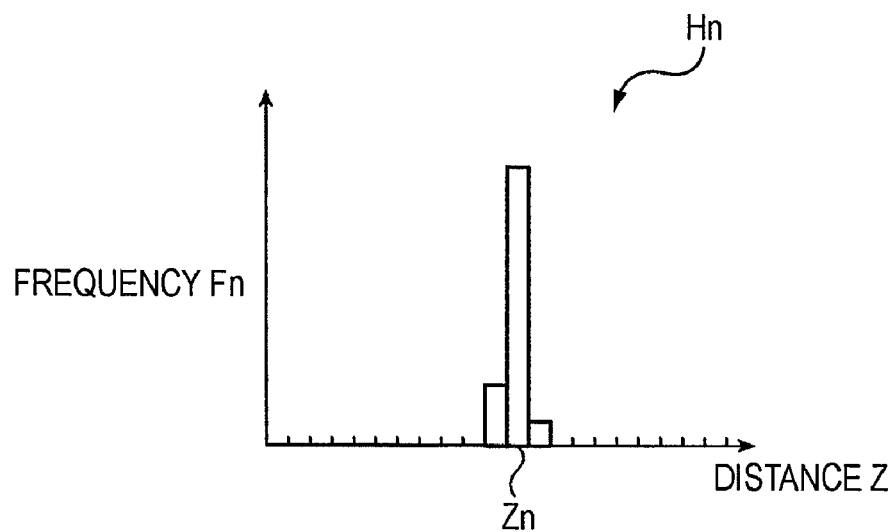
FIG. 8 shows an example of a histogram for extracting the distance of an object in each section shown in FIG. 7.

More specifically, the object detecting means 10 reads out the above-described distance image $T_Z$ from the distance-data memory 8, and divides the distance image $T_Z$ into vertical strip sections Dn each having a predetermined pixel width, as shown in FIG. 7. Then, the object detecting means 10 converts the parallaxes dp assigned to the reference pixel blocks $PB_O$ belonging to each strip section Dn into distances Z according to Expression (4) described above, forms a histogram Hn of the distances Z, as shown in FIG. 8, and sets a class value having the highest frequency Fn as an object distance Zn in the strip section Dn. This operation is performed for all sections Dn.

Figure 9:
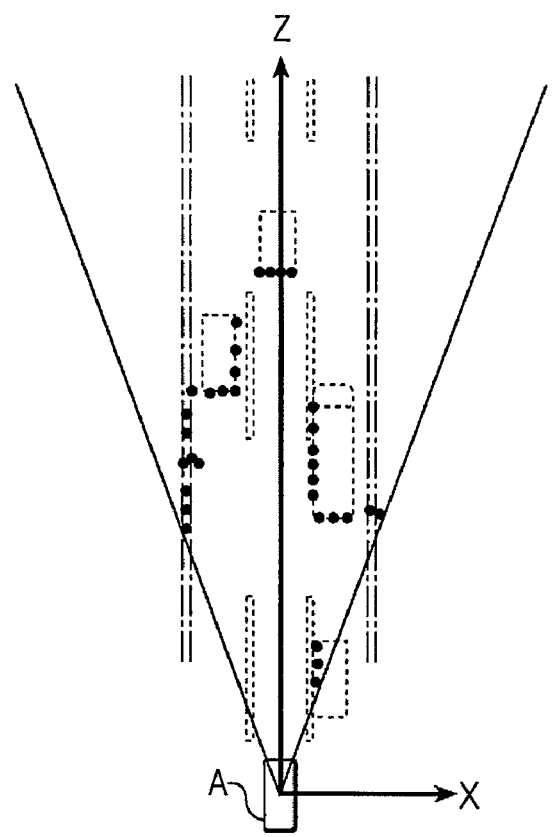
FIG. 9 shows distances of objects in the sections that are plotted in real space.
Figure 10:
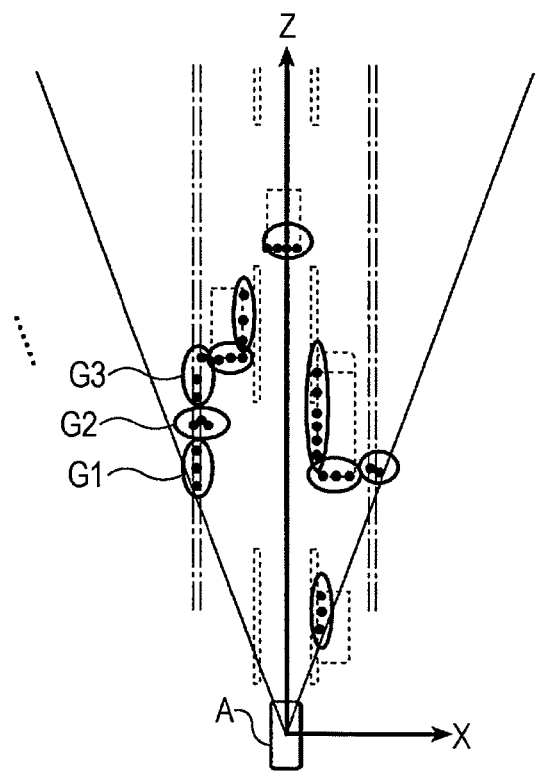
FIG. 10 explains grouping of dots shown in FIG. 9.

When the object detecting means 10 then plots the distances Zn obtained in the sections Dn are plotted in real space, the distances Zn are arranged, as shown in FIG. 9. The object detecting means 10 classifies the adjoining dots into groups G1, G2, G3, . . . on the basis of the distances between the plotted dots and directionality, as shown in FIG. 10.

Figure 11:
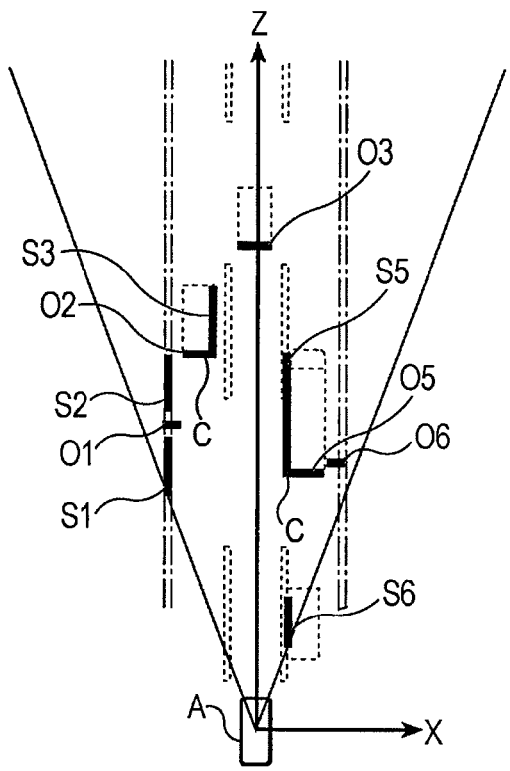
FIG. 11 shows objects obtained by linear approximation of dots belonging to groups shown in FIG. 10.

In this embodiment, the object detecting means 10 linearly approximates the dots belonging to each group, as shown in FIG. 11. The object detecting means 10 labels a group, in which the dots are arranged substantially parallel to the width direction of a vehicle A, that is, the X-axis direction, with an "object" O, and labels a group, in which the dots are arranged substantially parallel to the length direction of the vehicle A, that is, the Z-axis direction, with a "side wall" S. A point that can be regarded as an intersection of an "object" and a "side wall" of the same object is labeled with C as a corner point.

In the example shown in FIG. 11, the object detecting means 10 detects, as one object, each of [Side Wall S1], [Object O1], [Side Wall S2], [Object O2, Corner Point C, Side Wall S3], [Side Wall S4], [Object O3], [Object O4], [Side Wall S5, Corner Point C, Object O5], [Object O6], and [Side Wall S6]. While "Object" and "Side Wall" are used as labels for convenience, as described above, "side wall" is also detected as an object.

Figure 12:
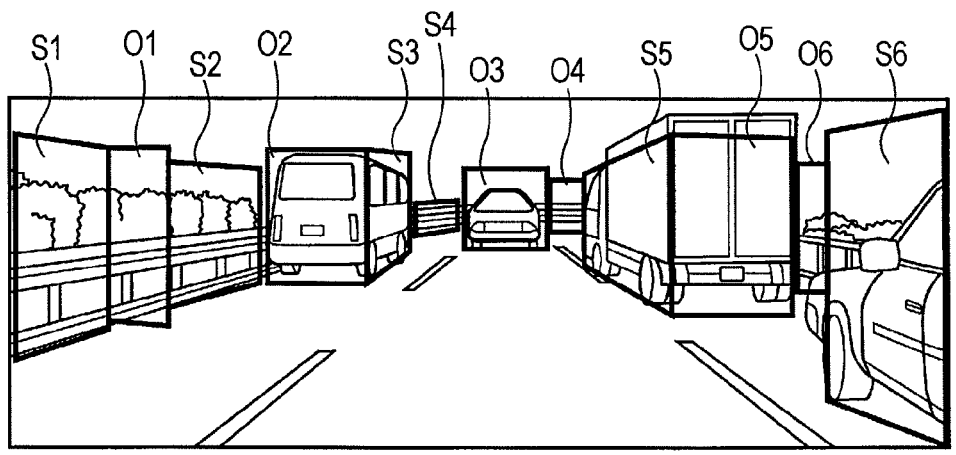
FIG. 12 shows detected objects enclosed by rectangular frames in the reference image.

As shown in FIG. 12, the object detecting means 10 sets regions, where images of the objects are taken, by setting rectangular frames that enclose the objects in the reference image $T_o$ on the basis of information about the detected objects, thus detecting the objects in the reference image $T_o$.

The object detecting means 10 calculates the positions (X1new, Y1new, Z1new) and (X2new, Y2new, Z2new) in real space of both ends of an approximation line representing each detected object relative to the vehicle A, and stores the positions in the memory (Step S2 in FIG. 5). Further, the object detecting means 10 stores, in the memory, information about the frames of the detected objects and information about a yaw rate γnew of the vehicle A transmitted from the sensors Q in the current frame.

When detecting the objects in the reference image $T_O$, the object detecting means 10 collates the relative positions (X1new, Y1new, Z1new) and (X2new, Y2new, Z2new) of both ends of each object with relative positions (X1old, Y1old, Z1old) and (X2old, Y2old, Z2old) of both ends of the object obtained in the previous frame and stored in the memory.

When it is determined, by smoothing filtering that will be described below (Step S13 in FIG. 6), that the object detected in the current frame matches with any object detected in the previous frame within the range of consistency with the speeds (ΔX1old, ΔY1old, ΔZ1old) and (ΔX2old, ΔY2old, ΔZ2old) in the X-axis direction, Y-axis direction, and Z-axis direction of both ends of an approximation line representing the object relative to the vehicle A, which have been calculated in the previous frame, the object detecting means 10 updates object information by adding a sign, which is the same as for the object detected in the previous frame, to the object detected in the current frame.

The estimated-region setting means 11 sets an estimated region, where an image of each object detected in the previous frame is expected to be taken in the current frame, in each of the reference image $T_O$ and the comparative image $T_C$, on the basis of the relative positions (X1old, Y1old, Z1old) and (X2old, Y2old, Z2old) of both ends of an approximation line representing the object calculated by the object detecting means 10 in the previous frame, the speeds (ΔX1old, ΔY1old, ΔZ1old) and (ΔX2old, ΔY2old, ΔZ2old) of both ends of the object relative to the vehicle A calculated in the previous frame, and the yaw rate γold of the vehicle A in the previous frame.

Figure 13:
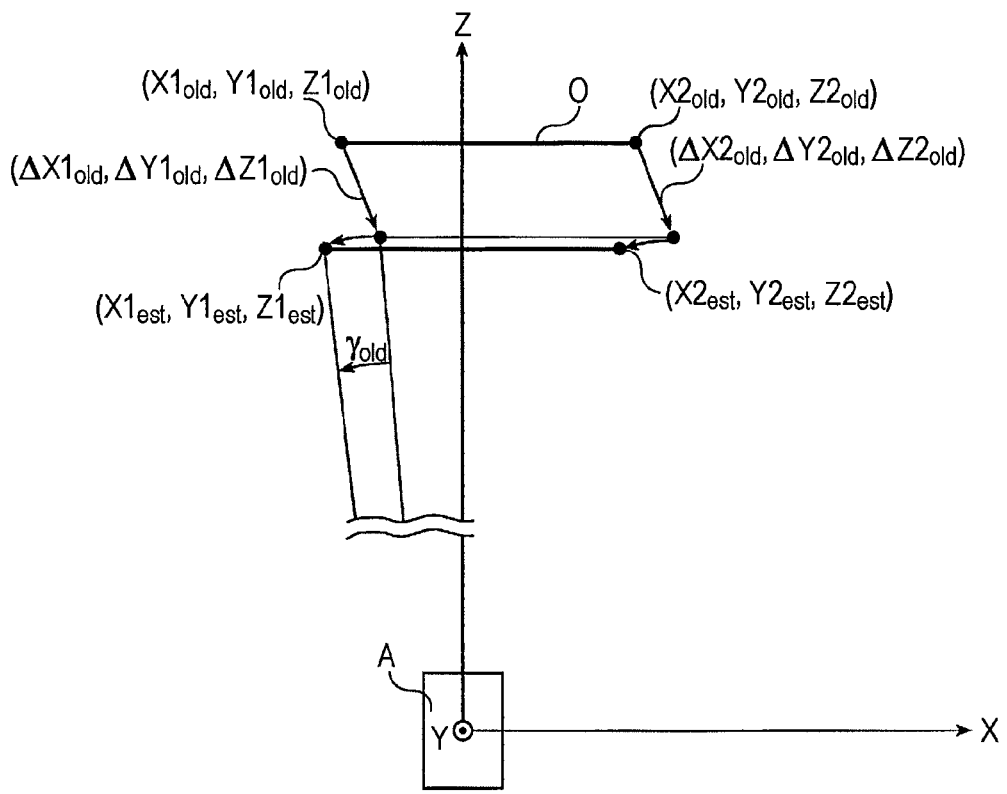
FIG. 13 explains a method for calculating relative positions, where an object is expected to exist in the current frame, on the basis of the previous frame by an estimated-region setting means.

More specifically, as shown in FIG. 13, the estimated-region setting means 11 reads out, from the memory, the relative positions (X1old, Y1old, Z1old) and (X2old, Y2old, Z2old) of both ends of an approximation line representing an object O calculated in the previous frame, and shifts the relative positions by the amount corresponding to the relative speeds (ΔX1old, ΔY1old, ΔZ1old) and (ΔX2old, ΔY2old, ΔZ2old) in the X-axis direction, Y-axis direction, and Z-axis direction of both ends of the object O in the previous frame. Then, the estimated-region setting means 11 turns the positions around the vehicle A by the amount corresponding to the yaw rate γold of the vehicle A measured in the previous frame, and thereby calculates positions (X1est, Y1est, Z1est) and (X2est, Y2est, Z2est) of both ends of the object, where the object is expected to exist in the current frame, relative to the vehicle A.

Figure 14A:
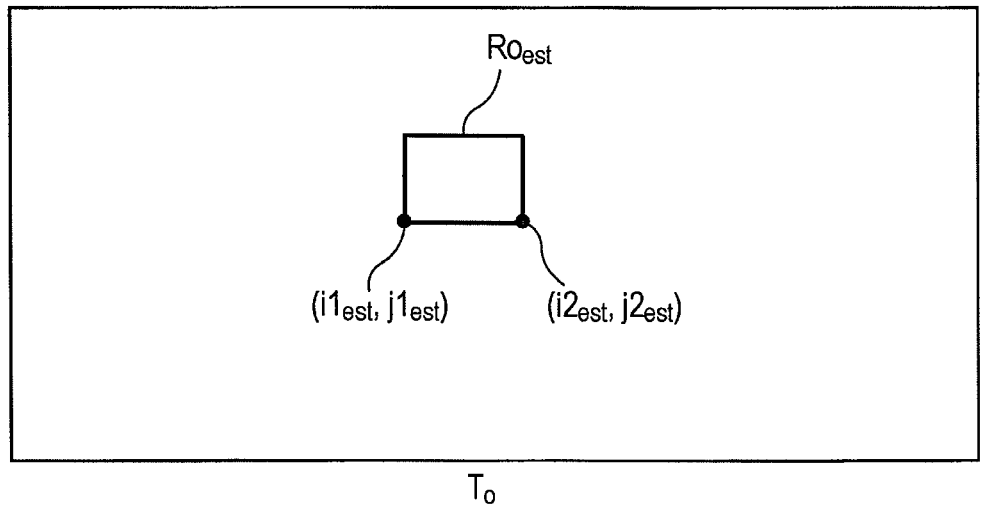
FIG. 14A shows an estimated region set in a reference image.

By substituting the calculated relative positions (X1est, Y1est, Z1est) and (X2est, Y2est, Z2est) into Expressions (2) and (3) described above, the coordinates (i1est, j1est) and (i2est, j2est) of the relative positions in the reference image $T_O$ are calculated. On the basis of the coordinates and information about the frame of the object O read out from the memory, an estimated region $R_O$est that is expected to include an image of the object O is set in the reference image $T_O$, as shown in FIG. 14A (Step S3 in FIG. 5).

Figure 14B:
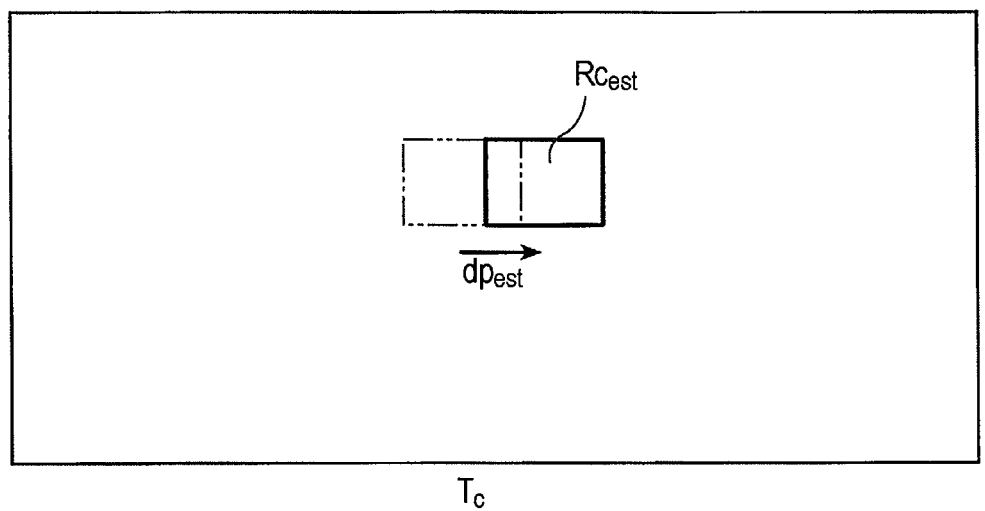
FIG. 14B shows an estimated region set in a comparative image.

Further, the estimated-region setting means 11 calculates an average Zest_ave of the Z coordinates Z1est and Z2est of the relative positions of the object O, and estimates a parallax $dp_{est}$ in the current frame by substituting the average into Expression (4). Thus, as shown in FIG. 14B, an estimated region $R_C$est is set at a position in the comparative image $T_C$ shifted from the estimated region $R_O$est set in the reference image $T_O$ by the parallax $dp_{est}$ (Step S4 in FIG. 5).

While seeking (Step S10, S11) that will be described below continues for an object, which has not been detected in the previous frame, estimated regions $R_O$est and $R_C$est are set for the object in the reference image $T_O$ and the comparative image $T_C$ in subsequent frames.

The estimated-region setting means 11 performs the above-described Steps S3 and S4 for all objects including an object that has not been detected in the previous frame.

The determination means 12 calculates an average p1$ij$_ave of luminances p1$ij$ in an estimated region $R_O$est which is set for each object in the reference image $T_O$ by the estimated-region setting means 11, calculates an average p2$ij$_ave of luminances p2$ij$ in an estimated region $R_C$est correspondingly set in the comparative image $T_C$, and then determines whether an absolute value |p1$ij$_ave—p2$ij$_ave| of the difference between the average values is more than or equal to a predetermined threshold value $\Delta$pth (Step S5).

When the absolute value |p1$ij$_ave—p2$ij$_ave| of the difference between the average values is less than the predetermined threshold value $\Delta$pth (Step S5; NO), the determination means 12 then determines whether an object is detected in the estimated region $R_0$est of the reference image $T_0$ (Step S6). When an object is detected (Step S6; YES), the determination means 12 holds information about the object stored in the memory, for example, the positions (X1new, Y1new, Z1new) and (X2new, Y2new, Z2new) in real space of both ends of the approximation line representing the object.

When the absolute value |p1$ij$_ave—p2$ij$_ave| of the difference between the average values is less than the predetermined threshold value $\Delta$pth (Step S5; NO) and an object is not detected in the estimated region $R_0$est of the reference image $T_0$ (Step S6; NO), it is determined that an object, based on which the estimated region $R_0$est is set in the reference image $T_0$, does not exist (in other words, is lost), information about the object stored in the memory is deleted (Step S7), and seeking for the object is stopped.

In contrast, when the absolute value |p1$ij$_ave-p2$ij$_ave| of the difference between the average values is more than or equal to the predetermined threshold value $\Delta$pth (Step S5; YES), the determination means 12 determines whether an object is detected in the estimated region $R_0$est of the reference image $T_0$ (Step S8). When an object is detected (Step S8; YES), since reliability of information about the detected object is low, information about the distance Zn of the object detected in the current frame and stored in the memory and information about the positions (X1new, Y1new, Z1new) and (X2new, Y2new, Z2new) in real space of both ends of the approximation line representing the object relative to the vehicle A are restored in the memory together with information that noise is included (Step S9).

When the absolute value |p1$ij$_ave—p2$ij$_ave| of the difference between the average values is more than or equal to the predetermined threshold value $\Delta$pth (Step S5; YES) and an object is not detected in the estimated region $R_0$est of the reference image $T_0$ (Step S8; NO), positions (X1new, Y1new, Z1new) and (X2new, Y2new, Z2new) in real space of both ends of an approximation line representing the object relative to the vehicle A are not detected. Accordingly, the determination means 12 sets information about positions (X1est, Y1est, Z1est) and (X2est, Y2est, Z2est) of both ends of the object relative to the vehicle A, where the object is expected to exist, as relative positions (X1new, Y1new, Z1new) and (X2new, Y2new, Z2new) of both ends of the object instead (Step S10), and sets information about the estimated region $R_0$est as information about a frame of the object. The determination means 12 also stores, in the memory, this information together with information that an object is not detected and information that noise is included (Step S11), and continues seeking for the object.

In this embodiment, the above-described determination whether an object is detected in the estimated region $R_0$est of the reference image $T_0$ (Step S6, S8) is made on the basis of determination whether the estimated region $R_0$est in the reference image $T_0$ overlaps with a region shown by a rectangular frame set in the reference image $T_0$ by the object detecting means 10. It is necessary for the regions to at least be in contact with each other. Even when the regions overlap in the reference image $T_0$, when the distance between the positions of the regions in real space is more than or equal to a predetermined distance, it is determined that an object is not detected in the estimated region $R_0$est.

In a case in which an object is sought when the object is not detected in the estimated region $R_0$est in the reference image $T_0$, as in this embodiment (Step S10, S11), when a state in which the object is not detected in the estimated region $R_0$est continues through a predetermined number of frames or more, it can be determined that the object does not exist in the reference image $T_0$, and information about the object can be deleted from the memory so as to stop seeking of the object.

When the above-described operations have not been completed for all objects in the estimated regions $R_0$est and $R_C$est including the object that has not been detected in the previous frame (Step S12; NO), the determination means 12 repeats Step S5 and subsequent steps. When the above-described operations for all objects have been completed (Step S12; YES), the determination means 12 reads out, from the memory, information about the objects that thus have been detected or have not been detected, as necessary.

Subsequently, the determination means 12 calculates relative speeds ($\Delta$X1new, $\Delta$Y1new, $\Delta$Z1new) and ($\Delta$X2new, $\Delta$Y2new, $\Delta$Z2new) of both ends of the object in the next frame.

In this embodiment, the relative speeds ($\Delta$X1new, $\Delta$Y1new, $\Delta$Z1new) and ($\Delta$X2new, $\Delta$Y2new, $\Delta$Z2new) of both ends of the object in the next frame are calculated by smoothing filtering. In smoothing filtering, the relative speeds ($\Delta$X1new, $\Delta$Y1new, $\Delta$Z1new) and ($\Delta$X2new, $\Delta$Y2new, $\Delta$Z2new) of both ends of the object used in the current frame and differences between the relative positions (X1old, Y1old, Z1old) and (X2old, Y2old, Z2old) of both ends of the object in the previous frame and the relative positions (X1new, Y1new, Z1new) and (X2new, Y2new, Z2new) of both ends of the object in the current frame are subjected to weighted addition by an addition ratio.

When the addition ratio is designated as P, the determination means 12 calculates relative speeds ($\Delta$X1new, $\Delta$Y1new, $\Delta$Z1new) and ($\Delta$X2new, $\Delta$Y2new, $\Delta$Z2new) in the next frame according to the following Expressions (5) to (10) (Step S13 in FIG. 6):

$$\Delta X1\text{new}=(1-P)\times\Delta X1\text{old}+P\times(X1\text{new}-X1\text{old}) \quad (5)$$

$$\Delta Y1\text{new}=(1-P)\times\Delta Y1\text{old}+P\times(Y1\text{new}-Y1\text{old}) \quad (6)$$

$$\Delta Z1\text{new}=(1-P)\times\Delta Z1\text{old}+P\times(Z1\text{new}-Z1\text{old}) \quad (7)$$

$$\Delta X2\text{new}=(1-P)\times\Delta X2\text{old}+P\times(X2\text{new}-X2\text{old}) \quad (8)$$

$$\Delta Y2\text{new}=(1-P)\times\Delta Y2\text{old}+P\times(Y2\text{new}-Y2\text{old}) \quad (9)$$

$$\Delta Z2\text{new}=(1-P)\times\Delta Z2\text{old}+P\times(Z2\text{new}-Z2\text{old}) \quad (10)$$

In Expressions (5) to (10) described above, when the object is detected in the estimated region $R_0$est of the reference image $T_0$ in the current frame, relative positions (X1new, Y1new, Z1new) and (X2new, Y2new, Z2new) in real space of both ends of an approximation lien representing the object are used as X1new, Y1new, Z1new, X2new, Y2new, and Z2new. When the object is not detected in the estimated region $R_0$est of the reference image $T_0$ in the current frame, the relative positions (X1new, Y1new, Z1new) and (X2new, Y2new, Z2new) of both ends of the object, which are defined by the relative positions (X1est, Y1est, Z1est) and (X2est, Y2est, Z2est) where the object have been expected to exist in Step S10), are used as X1new, Y1new, Z1new, X2new, Y2new, and Z2new. The relative positions (X1new, Y1new, Z1new) and (X2new, Y2new, Z2new) in the previous frame are used for X1old, Y1old, Z1old, X2old, Y2old, and Z2old (see Step S15 that will be described below).

When performing smoothing filtering according to Expressions (5) to (10) described above, the determination means 12 correlates information about the object subjected to calculation with information that noise is included. When the object is detected in the estimated region $R_0$est of the reference image $T_0$, the addition ratio P of the object is decreased so as to reduce contribution of the differences X1new-X1old and so on to smoothing. This is because reliability of information about the relative positions (X1new, Y1new, Z1new) and (X2new, Y2new, Z2new) of both ends of the object calculated in the current frame is low.

When the object is not detected in the estimated region $R_0$est of the reference image $T_0$, that is, when information about the relative positions (X1new, Y1new, Z1new) and (X2new, Y2new, Z2new) of both ends of the object is stored in the memory, but is correlated with information that the object is not detected and information about that noise is included, the determination means 12 sets the addition ratio P at 0 in Expressions (5) to (10). The relative speeds ($\Delta$X1old, $\Delta$Y1old, $\Delta$Z1old) and ($\Delta$X2old, $\Delta$Y2old, $\Delta$Z2old) of the object used in the current frame are also used as relative speeds ($\Delta$X1new, $\Delta$Y1new, $\Delta$Z1new) and ($\Delta$X2new, $\Delta$Y2new, $\Delta$Z2new) in the next frame.

This is because the object is not detected in the estimated region $R_0$est of the reference image $T_0$, and the relative positions (X1est, Y1est, Z1est) and (X2est, Y2est, Z2est) estimated for seeking the object are granted to be the relative positions (X1new, Y1new, Z1new) and (X2new, Y2new, Z2new) of the object.

Different addition ratios can be used in Expressions (5) to (10) described above, and can be adjusted independently.

Subsequently, the determination means 12 sets the calculated relative speeds ($\Delta$X1new, $\Delta$Y1new, $\Delta$Z1new) and ($\Delta$X2new, $\Delta$Y2new, $\Delta$Z2new) as relative speeds ($\Delta$X1old $\Delta$Y1old, $\Delta$Z1old) and ($\Delta$X2old, $\Delta$Y2old, $\Delta$Z2old) for use in the next frame (Step S14), sets the relative positions (X1new, Y1new, Z1new) and (X2new, Y2new, Z2new) as relative positions (X1old, Y1old, Z1old) and (X2old, Y2old, Z2old) (Step S15), and proceeds to processing for the next frame.

Operation of the object detecting system 1 according to this embodiment will now be described.

Figure 15A:
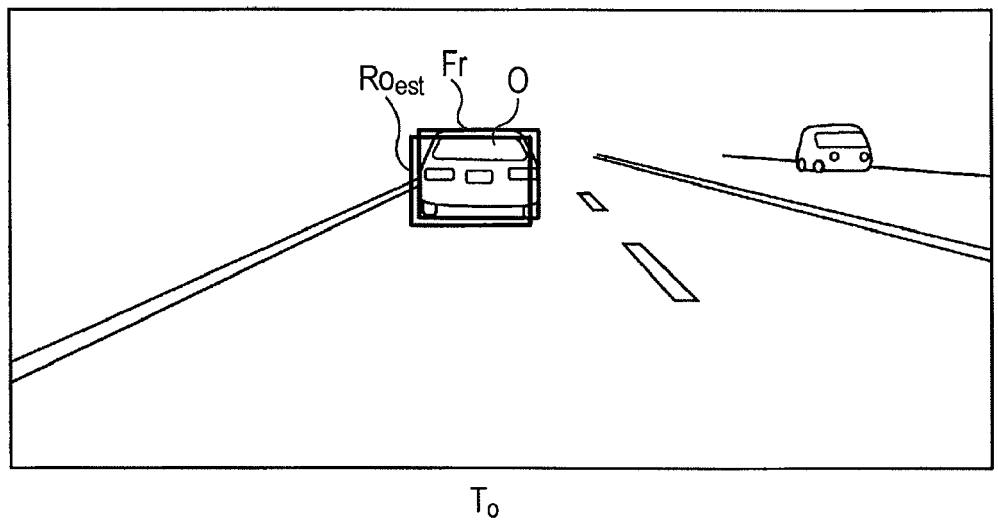
FIG. 15A shows an estimated region and a frame enclosing an object set in the reference image.
Figure 15B:
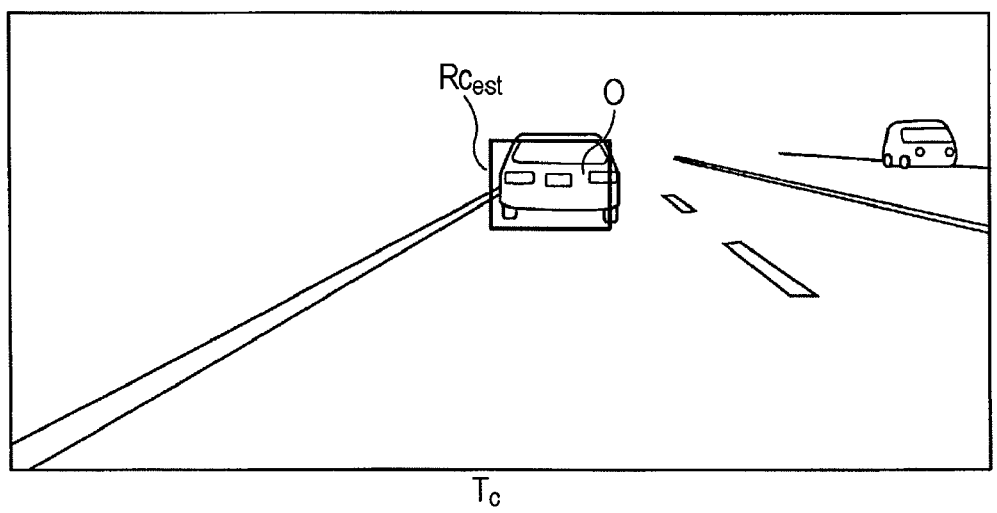
FIG. 15B shows an estimated region set in the comparative image.

In a reference image $T_0$ and a comparative image $T_C$ shown in FIGS. 15A and 15B, an object O exists near the center and a different object (oncoming vehicle) exists on the right side. Since the different object is processed similarly to the object O near the center, a description thereof is omitted below.

In normal object detection, estimated regions $R_0$est and $R_C$est are respectively set in the reference image $T_0$ and the comparative image $T_C$, as shown in FIGS. 15A and 15B. The estimated regions $R_0$est and $R_C$est include images of the same object O. Since the images of the same object O are taken with similar luminances in both the images $T_0$ and $T_C$, an average P1$ij$_ave of luminances p1$ij$ in the estimated region $R_0$est of the reference image $T_0$ is substantially equal to an average P2$ij$_ave of luminances p2$ij$ in the estimated region $R_C$est of the comparative image $T_C$.

Therefore, in a normal image taking state, it is considered that an absolute value |P1$ij$_ave−P2$ij$_ave| of the difference between the average values is a small value less than a threshold value $\Delta$pth (Step S5 in FIG. 5; NO). Then, the determination means 12 determines whether the object O is detected in the estimated region $R_0$est of the reference image $T_0$ (Step S6).

In this case, since the object O is detected in the reference image $T_0$, the object detecting means 10 sets a frame Fr that encloses the object O in the reference image $T_0$, as shown in FIG. 15A. In the reference image $T_0$, the frame Fr and the estimated region $R_0$est are set at almost the same position and overlap with each other, and the distance between the positions of the regions in real space is less than a predetermined distance. Therefore, the determination means 12 determines that the object O is detected in the estimated region $R_0$est of the reference image $T_0$ (Step S6 in FIG. 5; YES). The determination means 12 updates and maintains information about the object O, such as positions (X1new, Y1new, Z1new) and (X2new, Y2new, Z2new) in real space of both ends of an approximation line representing the object O relative to the vehicle A, in the memory (for example, Step S15 in FIG. 6), and seeks the object O.

Even though the absolute value |P1$ij$_ave−P2$ij$_ave| of the difference between the average luminances in the estimated regions $R_0$est and $R_C$est of the reference image $T_0$ and the comparative image $T_C$ is small (Step S5 in FIG. 5; NO), when the object O is not detected in the estimated region $R_0$est of the reference image $T_0$ (Step S6 in FIG. 5; NO), the determination means 12 determines that images of the object O are not included in the estimated regions $R_0$est and $R_C$est and that the object O does not exist in the reference image $T_0$. Then, the determination means 12 deletes information about the object O stored in the memory (Step S7), and stops seeking of the object O. These are the basic operations performed by the determination means 12 in the normal image taking state.

Figure 16A:
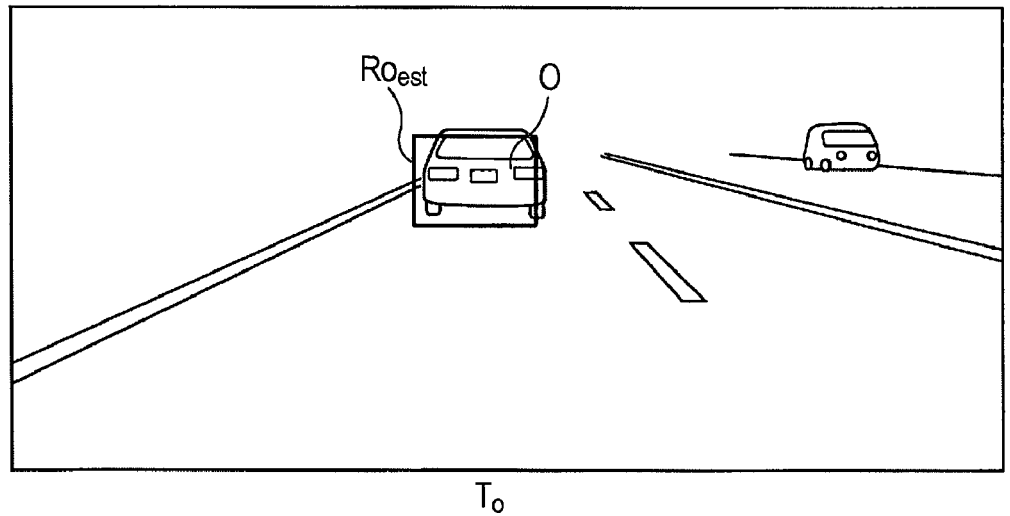
FIG. 16A shows a reference image including an image of an object.
Figure 16B:
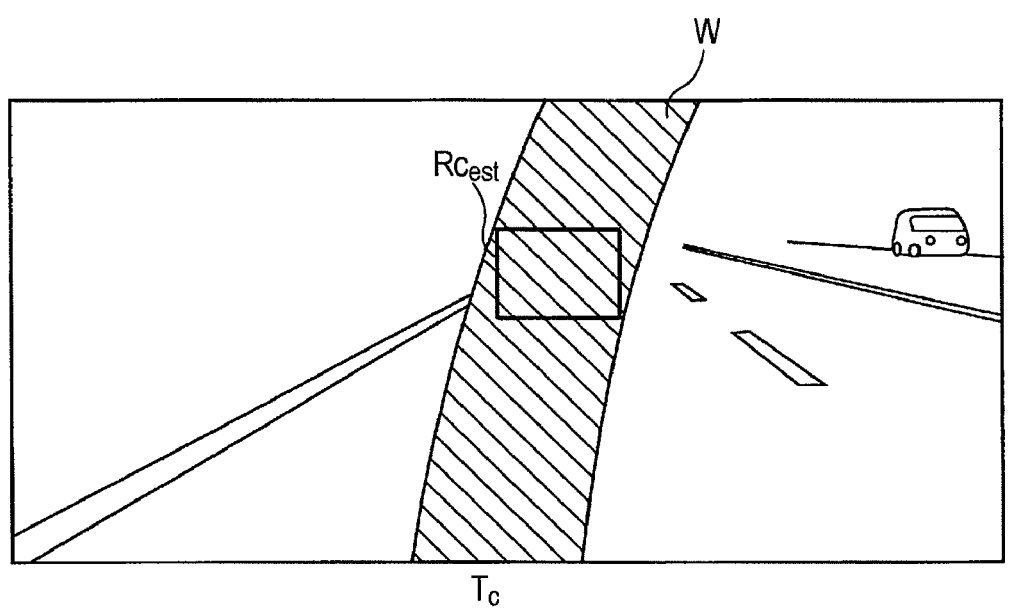
FIG. 16B shows a comparative image in which a taken image of the object is hidden by a wiper.

For example, it is assumed that a wiper W operates in case of rain and the image of the object O in the comparative image $T_C$ shown in FIG. 15B is hidden by the wiper W in the next frame, as shown in FIG. 16B. In this case, the main camera 2$a$ and the sub-camera 2$b$ are normally not placed at positions such that the image of the object in the reference image $T_0$ is hidden by the right wiper viewed from the driver's seat at the same timing as the timing when the image of the same object in the comparative image $T_C$ is hidden by the left wiper. Therefore, the image of the object O is included in the reference image $T_0$ as long as there is no other cause to hinder image taking, as shown in FIG. 16A.

In this state, the stereo matching means 7 cannot perform normal stereo matching, and the object detecting means 10 cannot detect the object O in the reference image $T_0$. Therefore, a frame enclosing the object O is not set in the reference image $T_0$.

However, as described above, the estimated regions $R_0$est and $R_C$est in the reference image $T_0$ and the comparative image $T_C$ in the current frame are set on the basis of the relative positions (X1old, Y1old, Z1old) and (X2old, Y2old, Z2old) of both ends of the object O detected by the object detecting means 10 according to the reference image $T_0$ and the comparative image $T_C$ in the previous frame shown in FIGS. 15A and 15B, and on the basis of the speeds ($\Delta$X1old $\Delta$Y1old, $\Delta$Z1old) and ($\Delta$X2old, $\Delta$Y2old, $\Delta$Z2old) of both ends of the object O relative to the vehicle calculated in the previous frame.

Figure 17:
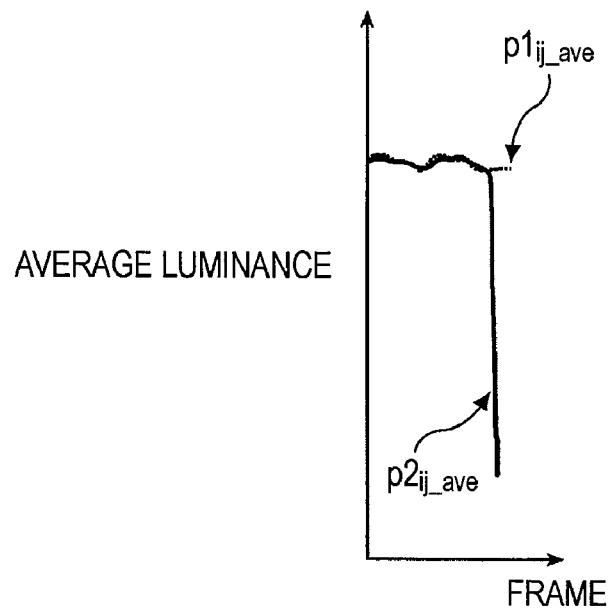
FIG. 17 is a graph explaining a state in which the average luminance of the estimated region in the comparative image greatly decreases in a situation shown in FIGS. 16A and 16B.

Therefore, even when the object O in the comparative image $T_C$ is hidden by the wiper W in the current frame, estimated regions $R_0$est and $R_C$est are set in the reference image $T_0$ and the comparative image $T_C$, as shown in FIGS. 16A and 16B. However, an average value p2$ij$_ave of luminances p2$ij$ of the estimated region $R_C$est in the comparative image $T_C$ significantly decreases, as shown in FIG. 17, because the estimated region $R_C$est is hidden by the wiper W. In contrast, an average value p1$ij$_ave of luminances p1$ij$ of the estimated region $R_0$est in the reference image $T_0$ does not change so much. For this reason, an absolute value |P1$ij$_ave−P2$ij$_ave| of the difference between the average luminances in the estimated regions R$_0$est and R$_C$est increases beyond the threshold value Δpth (Step S5 in FIG. 5; YES).

In this case, a frame enclosing the object O is not set in the reference image T$_0$, and a frame that overlaps with the estimated region R$_0$est in the reference image T$_0$ does not exist. Therefore, the determination means 12 determines that the object O is not detected in the estimated region R$_0$est of the reference image T$_0$ (Step S8; NO). In this embodiment, although a frame enclosing the object O is not set in the reference image T$_0$, the object O is not immediately lost. Information about the estimated relative positions (X1est, Y1est, Z1est) and (X2est, Y2est, Z2est) of both ends of the object O used to set the estimated region R$_0$est in the reference image T$_0$ is stored as relative positions (X1new, Y1new, Z1new) and (X2new, Y2new, Z2new) of both ends of the object O in the memory (Step S10), and seeking of the object O is continued.

However, since the object O is originally not detected by the object detecting means 10, information about the relative positions thereof is correlated with information that the object is not detected and information that noise is included (Step S11).

Figure 18:
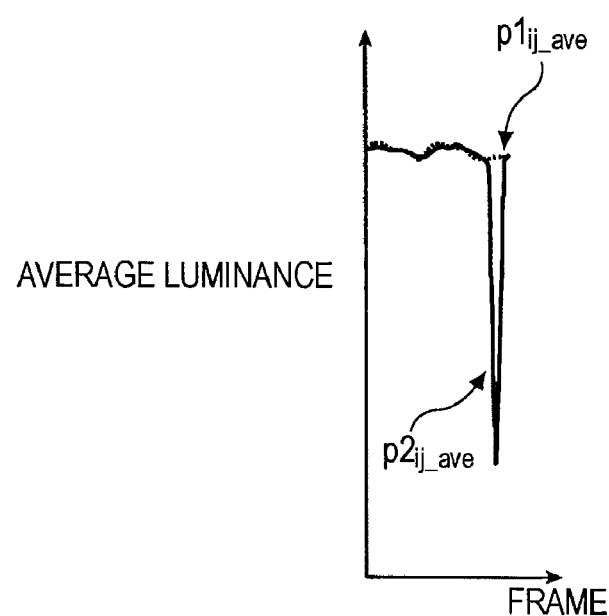
FIG. 18 is a graph explaining that the average luminance of the estimated region in the comparative image recovers when a state shown in FIGS. 15a and 15B is brought about again.

Depending on the sampling period of the stereo-image taking means 2 and the moving speed of the wiper W on the front glass, the wiper W normally comes out of the image in one or several frames. For example, on the condition that the wiper W passes over the taken image in one frame, the reference image T$_0$ and the comparative image T$_C$ return from the states shown in FIGS. 16A and 16B to the states shown in FIGS. 15A and 15B in the next frame. For this reason, as shown in FIG. 18, the average value p2$ij$_ave of luminances p2$ij$ in the estimated region R$_C$est of the comparative image T$_C$ substantially recovers to its initial value, and the absolute value |P1$ij$_ave−P2$ij$_ave| of the difference between the average luminances in the estimated regions R$_0$est and R$_C$est of the reference image T$_0$ and the comparative image T$_C$ returns to a small value (Step S5 in FIG. 5; NO).

Accordingly, basic processing operations in a normal image taking condition can be performed by the determination means 12 (Step S6, S7), and seeking of the object O can be continued.

Figure 19:
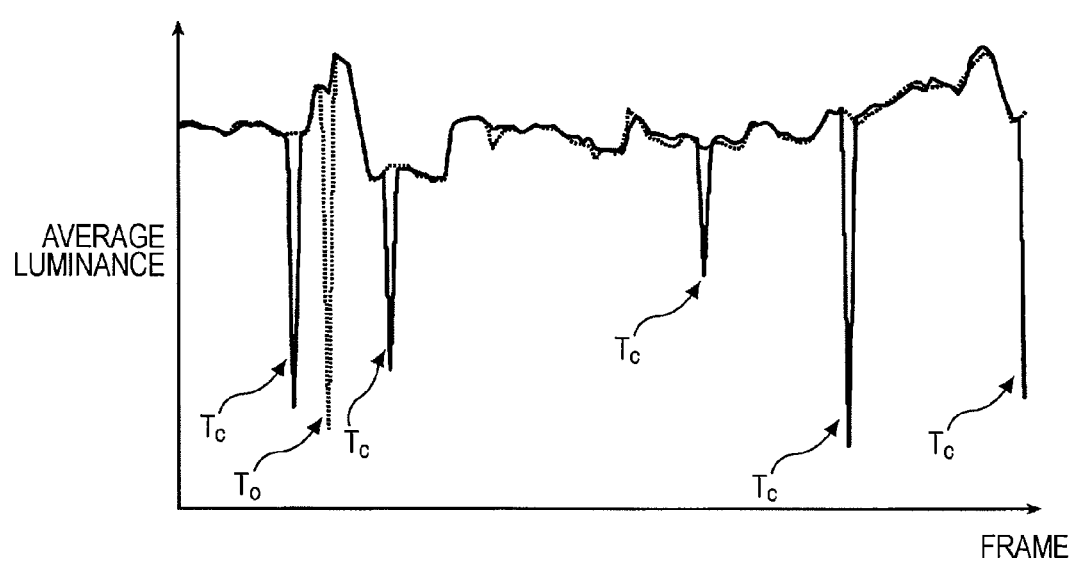
FIG. 19 is a graph showing the average luminances of the estimated regions in the reference image and the comparative image in a state in which the wiper cuts in front of a pair of image taking means.

The average luminances in the estimated regions also increase or decrease when the wiper W cuts in front of the main camera 2$a$ that takes the reference image T$_0$. As shown in FIG. 19, every time the wiper W cuts in front of the main camera 2$a$ and the sub-camera 2$b$, the average luminances p1$ij$_ave and p2$ij$_ave in the estimated regions R$_0$est and R$_C$est of the reference image T$_0$ and the comparative image T$_C$ taken by the cameras 2$a$ and 2$b$ greatly decrease only for one frame in this embodiment.

By utilizing the above-described change characteristics of the average values p1$ij$_ave and P2$ij$_ave of luminances p1$ij$ and p2$ij$ in the estimated regions R$_0$est and R$_C$est, it is possible to detect that the wiper W cuts in front of the main camera 2$a$ and the sub-camera 2$b$.

In other words, when the average luminance in one of the estimated region R$_0$est of the reference image T$_0$ and the estimated region R$_C$est of the comparative image T$_C$ is less than that of the other estimated region by the threshold value Δpth or more only in about one frame, the determination means 12 determines that the wiper W cuts in front of the main camera 2$a$ or the sub-camera 2$b$ to which the estimated region having the lower average luminance belongs. This makes it possible to detect that the wiper W has cut in front of the main camera 2$a$ and the sub-camera 2$b$.

Figure 20:
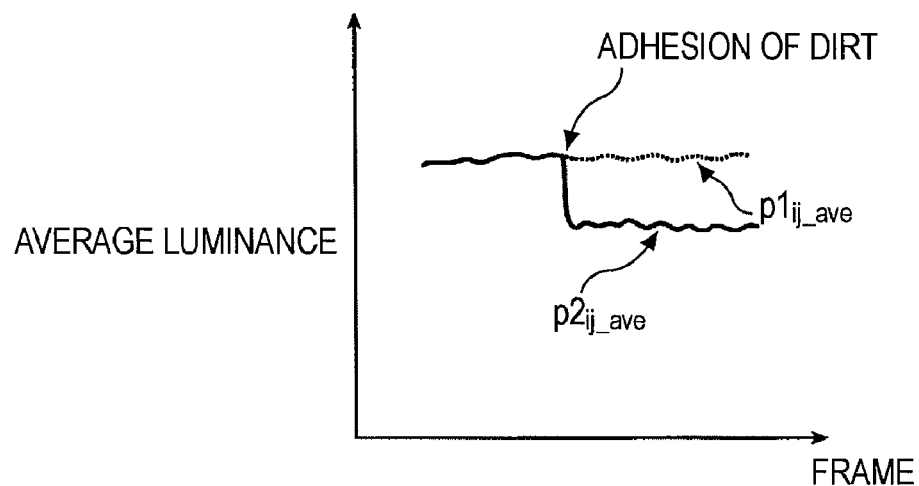
FIG. 20 is a graph showing changes in the average luminances of the estimated regions in the reference image and the comparative image caused when dirt adheres to a front glass in front of one of the image taking means.

On the other hand, when a substance, such as a raindrop or dirt, adheres to the front glass in front of one of the main camera 2$a$ and the sub-camera 2$b$, for example, when dirt adheres to the front glass in front of the sub-camera 2$b$ and an estimated region R$_C$est is set in a portion of the comparative image T$_C$ corresponding to the dirt, an average p2$ij$ ave of luminances P2$ij$ in the estimated region R$_C$est remains less than an average p1$ij$_ave of luminances p1$ij$ in an estimated region R$_0$est correspondingly set in the reference image T$_0$, as shown in FIG. 20.

Figure 21:
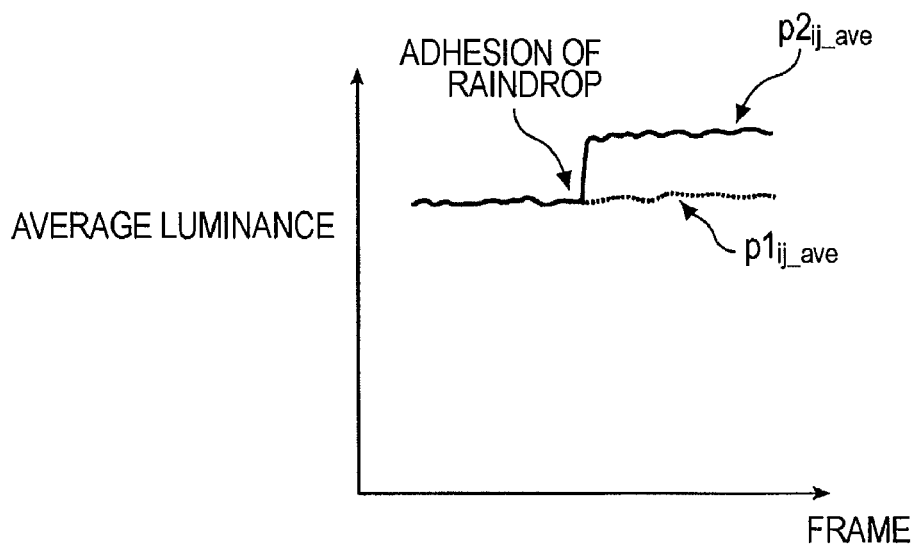
FIG. 21 is a graph showing changes in the average luminances of the estimated regions in the reference image and the comparative image caused when light is diffused because a raindrop adheres to the front glass in front of one of the image taking means.

For example, in a case in which a raindrop adheres to the front glass in front of the sub-camera 2$b$, when an oncoming vehicle exists at night, light from headlights of the oncoming vehicle is diffused by a portion where the raindrops adheres, and the luminance is increased. When an estimated region R$_C$est is set in a portion of the comparative image T$_C$ corresponding to the raindrop, an average p2$ij$_ave of luminances P2$ij$ in the estimated region R$_C$est remains more than an average p1$ij$_ave of luminances p1$ij$ in an estimated region R$_0$est correspondingly set in the reference image T$_0$, as shown in FIG. 21, contrary to the case shown in FIG. 20.

In these cases, if stereo matching is not normally performed and the object O cannot be detected in the reference image T$_0$, operations are performed similarly to the above-described case of the wiper.

However, stereo matching is sometimes performed by the stereo matching means 7 and an object can be detected in the reference image T$_0$ by the object detecting means 10. In this case, a frame enclosing the object is set in the reference image T$_0$. When an absolute value |p1$ij$ ave−p2$ij$ ave| of the difference between the average luminances of the estimated regions R$_0$est and R$_C$est in the reference image T$_0$ and the comparative image T$_C$ corresponding to the portion where the substance adheres is less than the threshold value Δpth (Step S5 in FIG. 5; NO), a normal object detecting operation is performed by the determination means 12 (Step S6, S7).

Even when stereo matching is performed and a frame enclosing the object is set in the reference image R$_0$, when the absolute value |p1$ij$_ave−p2$ij$_ave| of the difference between the average luminances of the estimated regions R$_0$est and R$_C$est in the reference image T$_0$ and the comparative image T$_C$ corresponding to the portion where the substance adheres is more than or equal to the threshold value Δpth (Step S5 in FIG. 5; YES), reliability of the detection result is low. For this reason, in this case, the determination means 12 stores information about the relative positions (X1new, Y1new, Z1new) and (X2new, Y2new, Z2new) of both ends of the object in the memory in correlation with information that noise is included (Step S9). Further, the information about the relative positions is output in correlation with the information that noise is included.

Unlike the above-described case of the wiper, when a substance adheres, a state in which the absolute value |p1$ij$_ave−p2$ij$_ave| of the difference between the average luminances of the estimated regions R$_0$est and R$_C$est in the reference image T$_0$ and the comparative image T$_C$ is more than or equal to the threshold value Δpth sometimes continues for a relatively long period. In this case, instructions to remove the adhering object can be given to the driver, for example, by sounding an alarm.

By utilizing the above-described change characteristics of the average values p1$ij$_ave and p2$ij$_ave of the luminances p1$ij$ and p2$ij$ in the estimated regions R$_0$est and R$_C$est, it can be detected that a substance adheres to the front glass in front of the main camera 2$a$ and the sub-camera 2$b$.

In other words, when the state in which the absolute value of the difference between the average luminances of the estimated region $R_O$est of the reference image $T_O$ and the estimated region $R_C$est of the comparative image $T_C$ is more than or equal to the threshold value Δpth continues for a predetermined number of frames or more, the determination means 12 determines that a substance adheres to the front glass in front of the main camera 2a or the sub-camera 2b. This makes it possible to detect that the substance adheres to the front glass in front of the main camera 2a or the sub-camera 2b.

In the above-described case in which an external environment changes, for example, when the preceding vehicle traveling along a road lined with trees is hidden in the shadows of the trees or receives sunbeams through leaves, the object, such as the preceding vehicle, itself becomes light or dark. Therefore, the average values p1$ij$_ave and p2$ij$_ave of the luminances p1$ij$ and p2$ij$ in the estimated regions $R_O$est and $R_C$est of the reference image $T_O$ and the comparative image $T_C$ including the image of the preceding vehicle decrease or increase simultaneously.

For this reason, the absolute value |p1$ij$_ave−p2$ij$_ave| of the difference between the average luminances remains small (Step S5 in FIG. 5; NO). In this case, the determination means 12 continues detection of an object, such as a preceding vehicle, by basic operation in a normal image taking state (Step S6, S7). While the normal object detecting operation is thus performed in the object detection system 1 of this embodiment even when an external environment suddenly changes, an operation different from the normal operation is performed when the average luminance decreases only in one of the estimated regions, as shown in FIGS. 17 to 19.

As described above, according to the object detecting system 1 of this embodiment, regardless of whether an object is detected in the reference image $T_O$ in the current frame, estimated regions $R_O$est and $R_C$est, in which images of the object are expected to be taken in the current frame, are respectively set in the reference image $T_O$ and the comparative image $T_C$ on the basis of the result of the previous frame. Further, it is determined whether information about the object detected in the estimated region $R_O$est or information that the object is not detected includes noise, on the basis of the absolute value |p1$ij$_ave−p2$ij$_ave| of the difference between the average luminances of the estimated regions $R_O$est and $R_C$est. Therefore, it is possible to accurately distinguish between a case in which noise is caused by the wiper cutting in front of one of the main camera 2a and the sub-camera 2b or a substance adhering to the front glass and a case in which the external environment changes.

Since the object can be detected by thus accurately distinguishing between noise and the change of the external environment, it is possible to accurately distinguish between a case in which only the external environment changes and information about the detected object and information that the object is not detected are highly reliable, and a case in which noise occurs and information about the detected object and information that the object is not detected are not reliable. When reliability of the information is low, information about the reliability can be output in proper correlation with the object information.

For example, when automatic running control of the vehicle is performed on the basis of the output information, the information can be used for automatic control after recognizing reliability of the information. This allows accurate automatic control.

In this embodiment, information about the object detected in the estimated region $R_O$est of the reference image $T_O$ or information that the object is not detected is correlated with information that noise is included, as described above. Alternatively, for example, information about the object can be correlated with reliability beforehand. By changing the reliability of information to a large value when the object is detected normally and to a small value when the object is not detected, the information can be correlated with information that noise is included.

Figure 22:
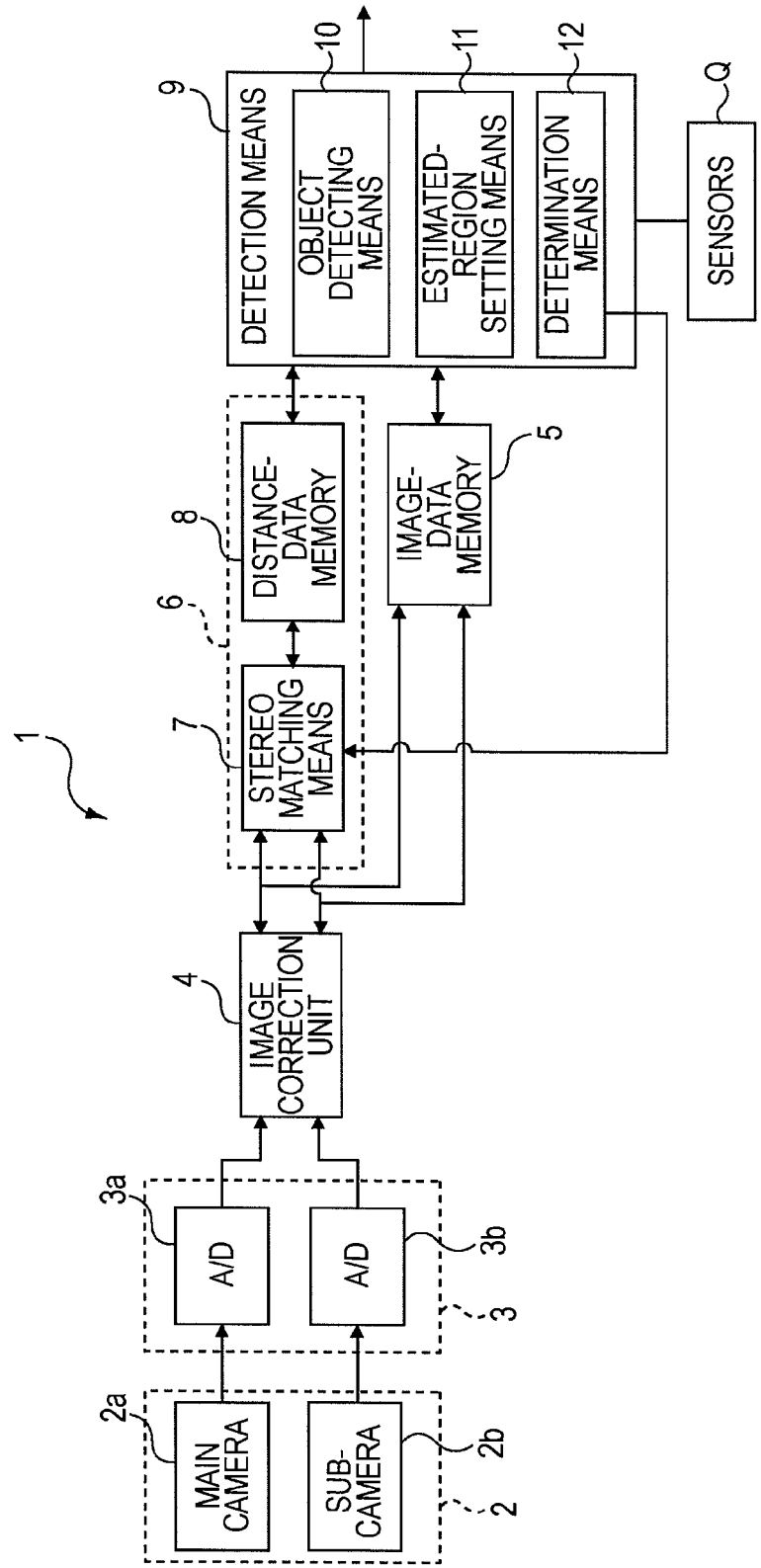
FIG. 22 is a block diagram showing a configuration adopted when a signal is transmitted from a determination means to a stereo matching means so as to tighten the criterion of stereo matching.

When information about the object detected in the estimated region $R_O$est of the reference image $T_O$ or information that the object is not detected is correlated with information that noise is included, a signal can be transmitted from the determination means 12 to the stereo matching means 7 so as to tighten the criterion of stereo matching in the stereo matching means 7, as shown in FIG. 22.

More specifically, a threshold value of a SAD value serving as the criterion of stereo matching is changed to a smaller value, and a comparative pixel block $PB_C$ is specified in the comparative image $T_C$ only when it has a luminance pattern similar to that of a reference pixel block $PB_O$ in the reference image $T_O$. In this case, even when the absolute value |p1$ij$_ave−p2$ij$_ave| of the difference between the average luminances of the estimated regions $R_O$est and $R_C$est in the reference image $T_O$ and the comparative image $T_C$ is large, reliability of information about the distance of the detected object can be improved further.

What is claimed is:

1. An object detecting system comprising:
 stereo-image taking means including a pair of image taking means mounted inside a front glass, the stereo-image taking means simultaneously taking images of an object around a vehicle in which the object detecting system is mounted, and outputting the images as a reference image and a comparative image;
 stereo matching means for performing, in the comparative image, stereo matching of a reference pixel block set in the reference image and having a predetermined number of pixels, and for calculating a parallax between the reference pixel block and a comparative pixel block specified in the comparative image, the parallax being calculated for each reference pixel block;
 object detecting means for calculating a distance of the object to the vehicle on the basis of the parallax and for detecting the object in the reference image on the basis of the distance;
 estimated-region setting means for setting, in the reference image and the comparative image, estimated regions where an image of the object is expected to be taken in a current frame, on the basis of the distance of the object in the reference image in the previous frame and a speed of the object relative to the vehicle calculated from the distance of the object to the vehicle; and
 determination means for determining whether an absolute value of a difference between an average luminance of the estimated region in the reference image and an average luminance of the corresponding estimated region in the comparative image is more than or equal to a predetermined threshold value, and for correlating information about the object detected in the estimated region of the reference image or information that the object is not detected, with information that noise is included in one of the taken images.

2. The object detecting system according to claim 1, wherein the determination means:
 decreases reliability of information about the parallax or the distance calculated for the object detected in the estimated region of the reference image; or decreases reliability of the information that the object is not detected in the estimated region of the reference image when the object is not detected in the estimated region of the reference image.

3. The object detecting system according to claim 1, wherein the object detecting means calculates a position of the detected object relative to the vehicle on the basis of the distance of the object to the vehicle, and stores the relative position in time series, wherein the estimated-region setting means estimates a relative position of the object in the current frame on the basis of the relative position and the relative speed of the object in the previous frame, and sets, in the reference image, an estimated region where an image of the object is expected to be taken, and wherein the estimated-region setting means estimates a parallax in the current frame on the basis of the estimated relative position of the object, and sets an estimated region in the comparative image on the basis of the parallax and the estimated region set in the reference image.

4. The object detecting system according to claim 3, wherein the relative speed in the next frame is calculated by smoothing filtering, in which the relative speed of the object used in the current frame and a difference between the relative positions in the previous frame and the current frame are subjected to weighted addition by an addition ratio.

5. The object detecting system according to claim 4, wherein, when the information about the object detected in the estimated region of the reference image is correlated with the information that noise is included, the addition ratio of the difference is decreased for the object in the smoothing filtering in the current frame.

6. The object detecting system according to claim 4, wherein, when the information that the object is not detected in the estimated region of the reference image is correlated with the information that noise is included, the relative speed used for the object in the current frame is set as the relative speed in the next frame.

7. The object detecting system according to claim 1, wherein the determination means deletes information about the object when the object is not detected in the estimated region set in the reference image.

8. The object detecting system according to claim 1, wherein, when the information about the object detected in the estimated region of the reference image or the information that the object is not detected is correlated with the information that noise is included, the determination means tightens a criterion of stereo matching performed by the stereo matching means.

9. The object detecting system according to claim 1, wherein, when the average luminance in one of the estimated region of the reference image and the estimated region of the comparative image is less than the average luminance of the other estimated region by the threshold value only for about one frame, the determination means determines that a wiper cuts in front of the image taking means that takes the reference image or the comparative image to which the estimated region having the lower average luminance belongs.

10. The object detecting system according to claim 1, wherein, when a state in which an absolute value of a difference between the average luminance in one of the estimated region of the reference image and the average luminance in the estimated region of the comparative image is more than or equal to the threshold value continues for a predetermined number of frames or more, the determination means determines that a substance adheres to the front glass in front of the image taking means that takes the reference image or the comparative image.

* * * * *